US010963851B2

(12) United States Patent
Block et al.

(10) Patent No.: US 10,963,851 B2
(45) Date of Patent: Mar. 30, 2021

(54) CASH ACCESS WITH AUTOMATIC TRANSACTION MACHINE WITH MOBILE PHONE

(71) Applicant: Diebold, Incorporated, North Canton, OH (US)

(72) Inventors: Brian Block, North Canton, OH (US); Sergio de Olveira, Massillon, OH (US); Alex Klein, Cuyahoga Falls, OH (US); Matt Zaugg, Munroe Falls, OH (US); Scott Dailey, Ann Arbor, MI (US); Eric Maibach, North Canton, OH (US); Stefan Bradstreet, North Canton, OH (US); Scott Witzke, North Canton, OH (US); Caleb Widmer, North Canton, OH (US); Shawn Reynolds, North Canton, OH (US)

(73) Assignee: Diebold Nixdorf, Incorporated, North Canton, OH (US)

( * ) Notice: Subject to any disclaimer, the term of this patent is extended or adjusted under 35 U.S.C. 154(b) by 529 days.

(21) Appl. No.: 15/288,593

(22) Filed: Oct. 7, 2016

(65) Prior Publication Data
US 2017/0132593 A1 May 11, 2017

Related U.S. Application Data

(60) Provisional application No. 62/239,589, filed on Oct. 9, 2015, provisional application No. 62/246,038, filed on Oct. 24, 2015.

(51) Int. Cl.
*G06Q 20/40* (2012.01)
*G06Q 20/10* (2012.01)
(Continued)

(52) U.S. Cl.
CPC ......... *G06Q 20/1085* (2013.01); *G06Q 20/32* (2013.01); *G06Q 20/3223* (2013.01);
(Continued)

(58) Field of Classification Search
USPC .......................................................... 705/43
See application file for complete search history.

(56) References Cited

U.S. PATENT DOCUMENTS 4,558,650 A * 12/1985 Berman ................ G07F 19/205
109/2
5,064,999 A 11/1991 Okamoto et al.
(Continued)

FOREIGN PATENT DOCUMENTS

GB 2461781 A 1/2010
JP 2005258745 9/2005

OTHER PUBLICATIONS

Virtual banking: Bringing your bank to the customer by Barone, Robert P. Texas Banking; Austin vol. 82, Iss. 10, (Oct. 1993): 1. https://search.proquest.com/docview/209740706/3FF38EAA7934F3EPQ/13?accountid=14753 (Year: 1993).*
(Continued)

*Primary Examiner* — Hani M Kazimi
*Assistant Examiner* — Hatem M Ali
(74) *Attorney, Agent, or Firm* — Black, McCuskey, Souers & Arbaugh LPA

(57) ABSTRACT

A cash-dispensing banking terminal has a housing, a transmitter, a receiver, a cash dispenser, and a processor to control the cash dispenser. A pre-created transaction request was earlier created with a mobile device before a banking customer and the mobile device arrive at the cash-dispensing banking terminal. A remote computing device authenticates and authorizes the transaction request before the customer and the mobile device arrive at the cash-dispensing banking
(Continued)

terminal. When the transaction is authenticated and authorized, a remote computer generates an executable transaction request and generates and sends a transaction identifier associated with an executable transaction request to the mobile device. The receiver receives the transaction identifier from the mobile device, when the customer is at the banking terminal. The remote computer and/or other devices verify the transaction identifier is valid. The banking terminal performs the transaction request while the customer is at the banking terminal.

14 Claims, 24 Drawing Sheets

(51) Int. Cl.
    *G07F 19/00*     (2006.01)
    *G06Q 20/32*     (2012.01)

(52) U.S. Cl.
    CPC ... *G06Q 20/3278* (2013.01); *G06Q 20/40145* (2013.01); *G07F 19/206* (2013.01)

(56) References Cited

U.S. PATENT DOCUMENTS

| | | | |
|---|---|---|---|
| 6,456,984 | B1 | 9/2002 | Demoff et al. |
| 7,310,608 | B2 | 12/2007 | Nakajima et al. |
| 7,630,939 | B1* | 12/2009 | Kolls ............ G07F 5/18 705/43 |
| 2004/0024351 | A1 | 12/2004 | Kurihara et al. |
| 2004/0243515 | A1* | 12/2004 | Kurihara ........... G06Q 20/425 705/41 |
| 2011/0016047 | A1* | 1/2011 | Wu ............ G06Q 20/1085 705/43 |
| 2012/0197797 | A1 | 8/2012 | Grigg et al. |
| 2013/0124410 | A1* | 5/2013 | Kay ............... H04W 4/02 705/43 |
| 2013/0212004 | A1* | 8/2013 | Itwaru ............ G06Q 20/20 705/39 |
| 2013/0238497 | A1 | 9/2013 | Ramachandran et al. |
| 2015/0100489 | A1* | 4/2015 | Graef ............ G06Q 20/1085 705/43 |
| 2017/0262823 | A1* | 9/2017 | Hartung ........... G06Q 20/401 |

OTHER PUBLICATIONS

A new era for ATMs by Grant, Nancy E. U.S. Banker; New York vol. 105, Iss. 6, (Jun. 1995): 57. https://search.proquest.com/docview/200697801/3FF38EAA7934F3EPQ/22?accountid=14753 (Year: 1995).*

ATM Revolution Keeps Marching on Banks that improve functionality . . . by Shanahan, James B. American Banker (pre-1997 Fulltext); New York, N.Y. [New York, N.Y]Nov. 27, 1995: 2.A. https://search.proquest.com/docview/293030325/3FF38EAA7934F3EPQ/23?ac (Year: 1995).*

International Search Report and Written Opinion of corresponding PCT Application.

USPTO; Office Action; U.S. Appl. No. 15/767,092; Notification dated Mar. 17, 2020.

* cited by examiner

CASH ACCESS WITH AUTOMATIC TRANSACTION MACHINE WITH MOBILE PHONE

CROSS REFERENCE TO RELATED APPLICATIONS

This application claims the benefit under 35 U.S.C. § 119 of U.S. Provisional Application No. 62/239,589 filed Oct. 9, 2015 and U.S. Provisional Application No. 62/246,038 filed Oct. 24, 2015, both of which are herein incorporated by reference.

FIELD OF THE INVENTION

Various configurations of the current invention relate generally to apparatus, systems, and methods allowing a customer to more efficiently bank. More particularly, the apparatus, systems, and methods relate to allowing customers to use a mobile phone for some banking transactions. Particularly, the apparatus, systems, and methods relate to allowing customers to use a mobile phone for withdrawing cash from an automatic transaction machine (ATM).

BACKGROUND

At most modern cash machines, the customer is identified by inserting a plastic ATM card with a magnetic stripe or a plastic smart card with a chip that contains a unique card number and some security information such as an expiration date and a code verification value (CVV). Authentication is often provided by the customer entering a personal identification number (PIN).

Using a cash machine, customers can access their bank deposit or credit accounts in order to make a variety of transactions such as cash withdrawals, check balances, or credit mobile phones. In some instances, if the currency being withdrawn from the cash machine is different from that in which the bank account is denominated the money will be converted at an official exchange rate so that ATMs often provide the best possible exchange rates for foreign travelers. There remains a need for better ATM transactions and related systems and methods.

SUMMARY OF THE INVENTION

One embodiment is a cash-dispensing banking terminal having a housing, a transmitter, a receiver, a cash dispenser, and a processor to control the cash dispenser. A pre-created transaction request was earlier created on a mobile device (e.g., a mobile phone) before a banking customer and the mobile device arrive at the cash-dispensing banking terminal. A remote computing device authenticates and authorizes the pre-created transaction request before the customer and the mobile device arrive at the cash-dispensing banking terminal. When the transaction is authenticated and authorized, a remote computer generates an executable transaction request and generates and sends a transaction identifier associated with the executable transaction request to the mobile device. The receiver receives the transaction identifier from the mobile device, when the customer is at the banking terminal. The remote computer and/or other devices verify the transaction identifier is valid, and when the transaction identifier is valid the banking terminal performs the transaction request while the customer is at the banking terminal.

In some embodiments, the executable banking transaction request includes a request to dispense an amount of currency from the banking terminal. The amount of currency may be pre-deducted from a banking account of the banking customer before the banking customer is at the banking terminal. In some embodiments, the transaction identifier is valid for a limited time and after the limited time the transaction identifier is void and the banking transaction request cannot be performed. The limited time may be two hours or less or may be another appropriate time.

In some embodiments, the banking terminal is an automatic transaction machine (ATM) lacking a keypad, lacking a card reader, and/or lacking user interface buttons or having a limited number of interface buttons. The receiver may receive the banking transaction request using wireless near field communication (NFC) traveling a distance of three feet or less and the transmitter may be an NFC wireless transmitter. Software on the mobile device may communicate with the remote computing device to authenticate and authorize the pre-created banking transaction before the banking customer and the mobile device arrive at the cash-dispensing banking terminal. The transaction identifier may contain a biometric input, a quick response (QR) code, and/or a symbol. In some configurations, the receiver may receive the transaction identifier from the mobile device when the mobile device is tapped against the banking terminal. An optional vault may be loaded with the cash and dispense cash responsive to the banking transaction.

Another configuration of an embodiment is an automatic transaction machine (ATM) banking terminal. The ATM banking terminal has, a housing, a transmitter, a receiver, a cash dispenser dispense cash, and a processor at least partially controlling the cash dispenser. The ATM banking terminal is unlike popular traditional ATMs because it lacks a keypad, lacks a card reader, and lacks more than three customer interface buttons. A remote computer will receive a per-created banking transaction request from a mobile device. The pre-created transaction request was created through the mobile device, such as a mobile phone, in communication with a bank computer network with the mobile device located away from the ATM banking terminal and with no communications with the ATM banking terminal. The pre-created banking transaction was also matched to a banking account and authenticated while the mobile device was located away from the ATM banking terminal and when it had no interactions with the banking terminal. No authentication of the mobile device nor the transaction identifier is performed at the banking terminal. The receiver receives the transaction identifier from the mobile device when the banking customer is at the banking terminal. The remote computer or another device(s) verifies the transaction identifier is valid after it is received at the banking terminal. When the transaction identifier is valid, the banking terminal causes the performance of the executable transaction request while the banking customer is at the banking terminal. For example the transaction may cause cash to be dispensed at the banking terminal.

Another embedment is a method of withdrawing cash at an ATM banking terminal. The method receives at the ATM banking terminal a transaction identification of a cash withdrawal transaction request for an amount of cash. The cash withdrawal transaction request was previously created by a banking customer using a device remote from the ATM banking terminal and was created before the banking customer arrived at the ATM banking terminal with the cash transaction identification. The transaction identifier is validated. In some embodiments, the ATM banking terminal in communication with the banking system equipment may verify the transaction identifier by checking with the banking system computer to determine if the transaction identifier is still valid, has proper fields and/or formats and/or has other characteristics as understood by those of ordinary skill in the art. When the transaction identifier is valid, the banking terminal performs the cash withdrawal transaction request. In the preferred embodiment, the withdrawal transaction request is executed while the banking customer is at the banking terminal by dispensing at the banking terminal the amount of cash as earlier specified by the cash withdrawal transaction to the banking customer.

BRIEF DESCRIPTION OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION OF THE DRAWINGS

Details are set forth in the following description and in FIGS. 1-19 provide a thorough understanding of various embodiments of the invention. Those of ordinary skill in the art will understand that the example embodiments may have additional components and configurations that may be practiced without several of the details described below. In some instances, persons of ordinary skill in the art will appreciate that the methods and systems described herein can include additional details without departing from the spirit or scope of the disclosed embodiments. Additionally, some known structures and systems associated with automated transaction machines (ATMs), mobile devices, and associated computer networks have not been shown or described in detail below to avoid unnecessarily obscuring the described embodiments.

Additionally, functionality of components of the systems described below may be implemented with one or more processors executing software instructions and/or be implemented with other hardware logic. "Processor" and "Logic", as used herein, includes but is not limited to hardware, firmware, software and/or combinations of each to perform a function(s) or an action(s), and/or to cause a function or action from another logic, method, and/or system. For example, based on a desired application or needs, logic and/or processor may include a software-controlled microprocessor, discrete logic, an application specific integrated circuit (ASIC), a programmed logic device, a memory device containing instructions or the like. Logic and/or processor may include one or more gates, combinations of gates, or other circuit components. Logic and/or a processor may also be fully embodied as software. Where multiple logics and/or processors are described, it may be possible to incorporate the multiple logics and/or processors into one physical logic (or processors). Similarly, where a single logic and/or processor is described, it may be possible to distribute that single logic and/or processor between multiple physical logics and/or processors.

Figure 1:
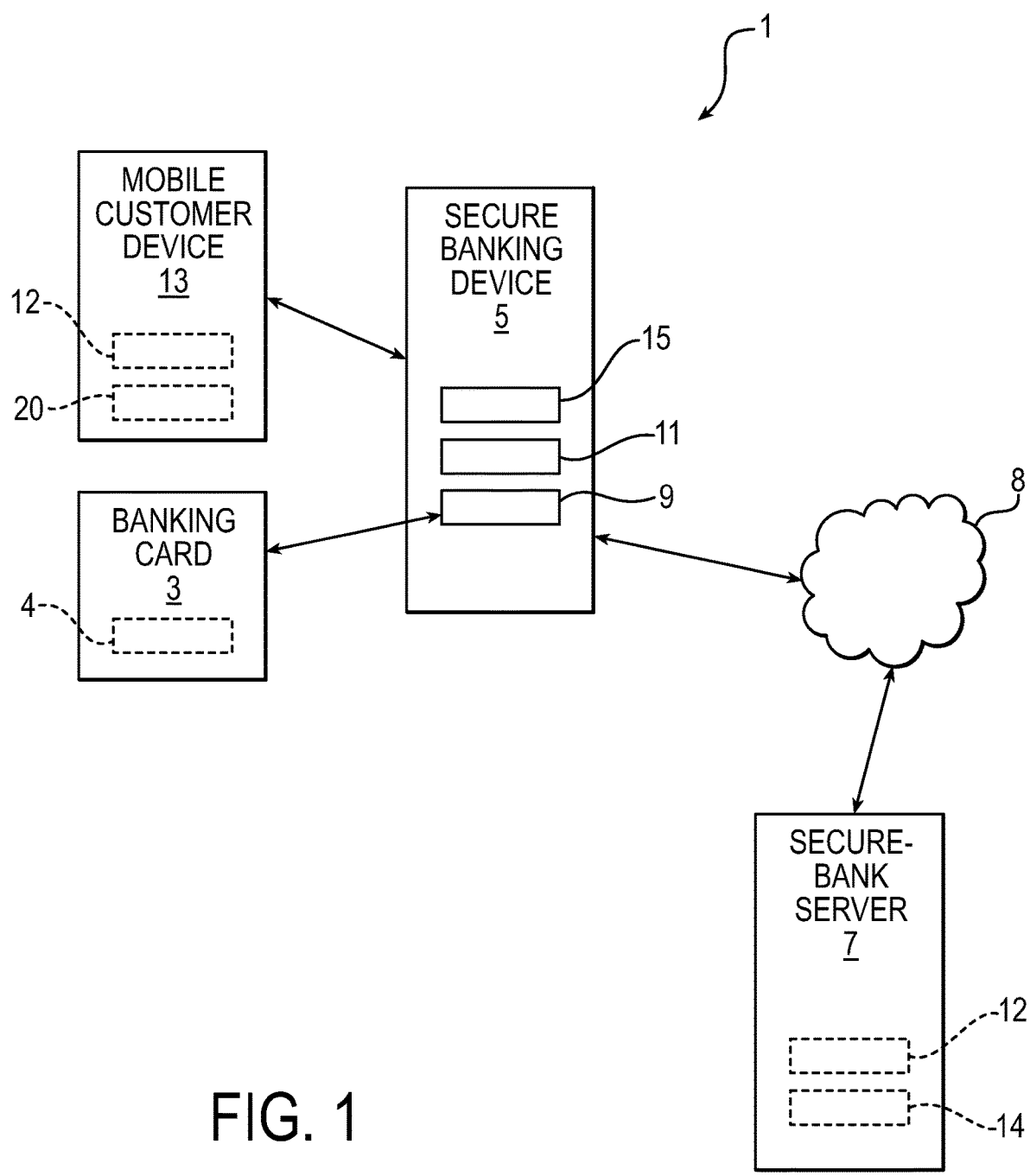
FIG. 1 illustrates an example system for onboarding banking-account information from a banking card to a secure-bank computing device.

FIG. 1 illustrates one example embodiment of a system 1 for "onboarding" of banking-account information 4 from a banking card 3 at a banking-device terminal 5 and then onto a secure-bank computing device(s) 7 such as a secured computer, server or other device that may securely store information 4 from banking card 3. Onboarding is the general process of an owner of the banking card 3 uploading banking-account information 4 stored on the card 3 to the secure-bank computing device 7 along with optionally uploading other personal information. In some embodiments, only the account number may be uploaded to the secure-bank computing device 7. This information 4 is stored on the secure-bank computing device(s), weeks, months, years or until an account associated with the stored account information is closed and the stored account information is removed/deleted from the bank computing device(s) 7 or removed in another affirmative way. A banking customer that has already onboarded the required information from the card 3 to the secure-bank computing device 7 may, in the future, return to a banking-device terminal 5 or another similar device and conduct future banking financial transaction(s) where the customer normally needs to be present with their card. However and as discussed further below, when the banking information 4 has been prior onboarded to the secure-bank computing device 7, the customer may return to the banking-device terminal 5 or similar device and still conduct transactions without their card being present by verifying their personal presence without their card, for example, by identifying themselves with biometric data, a PIN number, or in another way to begin a financial transaction.

In essence, onboarding provides a way of moving existing security credentials from the banking card 3 to the secure-bank computing device 7 (e.g., server) and a mobile-customer device 13 (discussed below) such as a cell phone that is carried by a banking customer. For example, in the future, the owner of the credit card 3 may return to the banking-device terminal (e.g., ATM) or a different terminal and conduct a financial transaction with an account linked to the banking card 3 without needing to use or have the banking card 3 present. The mobile-customer device 13 of the customer provides security credentials linked to the onboarded account information stored in the secure-bank computing device 7 to authorize transactions to the corresponding bank account without requiring use of the banking card 3.

The banking card 3 may be a bank issued card associated with a savings account, a checking account with a bank or another type of account. In some embodiments, banking card 3 may be a credit card, debit card or another type of card. Banking-device terminal 5 may be an automatic transaction machine (ATM), a point of sale (POS), a bill pay terminal or another type of device as understood by those of ordinary skill in the art. In some embodiments, preferably the banking-device terminal 5 is located in an at least a partially secure area such as at a bank or inside a retail establishment to provide a customer using the terminal 5 a sense of security so that they will feel free to upload their data from their card 3 as well other data or personal data to the secure-bank computing device 7. Of course, the banking-device terminal 5 may be connected to one or more networks 8, including the internet so that signals traveling between the secure-bank computing device 7 and the banking-device terminal 5 will travel through those networks 8 before reaching the secure-bank computing device 7.

In some configurations, the banking-device terminal 5 includes a card-reading device 9 for receiving the banking card 3 and reading banking-account information 4 from the banking card 3. The banking-device terminal 5 further has at-least-one input device for receiving a verification input that associates the banking card with a banking customer. For example, the input device may include a keypad 11 allowing a customer to input a personal identification number (PIN), iris scan, fingerprint and/or another item that is unique to that customer. This provides a level of security to ensure that the person onboarding (uploading) a bank account to the banking-device terminal 5 is the actual owner of the banking card 3. The input device may also be used for receiving a request for an onboarding transaction that indicates to the banking-device terminal 5 that the customer of the banking card 3 desires to upload (onboard) data from their card 3 to the secure-bank computing device 7.

Upon verifying that the customer is an authorized user of the banking card 3 and has permission to onboard their banking information to 4 the secure-bank computing device 7, the onboarding transaction is authorized. When authorized, the secure-bank computing device 7 is configured to request a customer-device identification 12 of the mobile-customer device 13 to be used for future-banking transactions. This request is generated and activated by any way as understood by those in ordinary skill in the art. For example, the request for the customer-device identification 12 may be generated by processor logic in the banking-device terminal 5 and displayed on a display 15 on the terminal 5. For example, the customer-device identification 12 may be a numeric phone number that the customer enters into the keypad 11. The banking-device terminal 5 receives the customer-device identification 12 and begins the process of transmitting and storing account data 4 associated with a banking account being onboarded to the secure-bank computing device 7. Having collected and stored account information 4 associated with the banking card 3 and the customer-device identification 12, allows this information to later be used for future-banking transactions without requiring the presence of the banking card 3.

In other embodiments, data collected at the banking-device terminal 5 and stored at the secure-bank computing device(s) 7 may be referred to as a "mobile wallet dataset". The mobile wallet dataset includes a personal banking card data set and a personal information data set that may also be collected and onboarded to the secure-bank computing devices(s) 7. The personal banking card data set may correspond to a bank card, credit card or a debit card and may include information such as an account information number, a card verification value CVV, and expiration data, and the like with the personal information data including such things as card holder's name, address, phone number(s) and/or social security number and the like.

In some configurations, after a customer has onboarded an account associated with a first banking account from a banking card, they may be prompted at the secure banking terminal 5 if they desire to upload a second banking account associated with another banking card. Having already entered their verification input (e.g., PIN) and customer-device identification 12 (e.g., phone number) for their mobile-customer device (e.g., cellular phone), they would not need to reenter this information because they have already been authenticated as the owner of the first banking card. They would simply be required to have the banking-device terminal 5 read their second banking account read from the second banking card and confirm that they desire to onboard that data to the secure-bank computing device(s) 7.

In some embodiments, the customer-device identification 12 is solely stored on the mobile-customer device 13 and the banking-account information 4 is solely stored on the remote server (remote bank computing device 7). In the future, when an electronic payment (or another transaction) is being processed on the mobile-customer device 13, the secured server 7 would match the customer-device identification 12 with the account number 14 when balancing the account 14. In some configurations, the banking-account information 4 may primarily contain the account number 14 and possible a correct security feature such as a PIN or biometric data corresponding to the customer of the account number 14. In some embodiments, the customer-device identification 12 may contain a phone number of a mobile phone when a mobile phone is used as the mobile-customer device 13. In other embodiments, the customer-device identification 12 and/or the account number 14 may contain the media access control (MAC) and/or another number of a mobile-customer device 13. The customer-device identification 12 may contain personal information such as the customer's address and other information allowing for future electronic payments using the mobile-customer device 13 and the account number 14.

Figure 2:
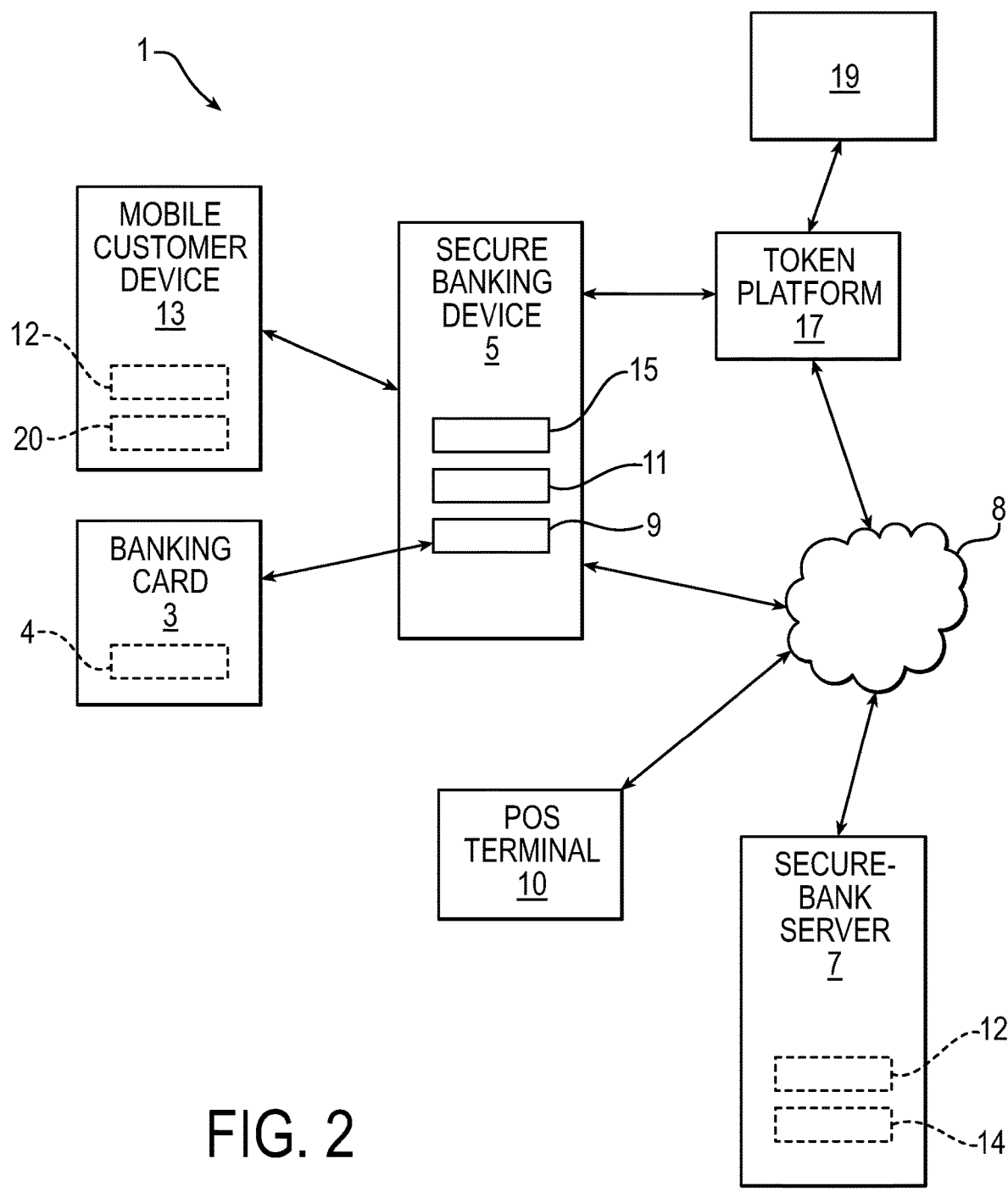
FIG. 2 illustrates another example system for onboarding banking-account information from a banking card to a secure-banking system.
Figure 3:
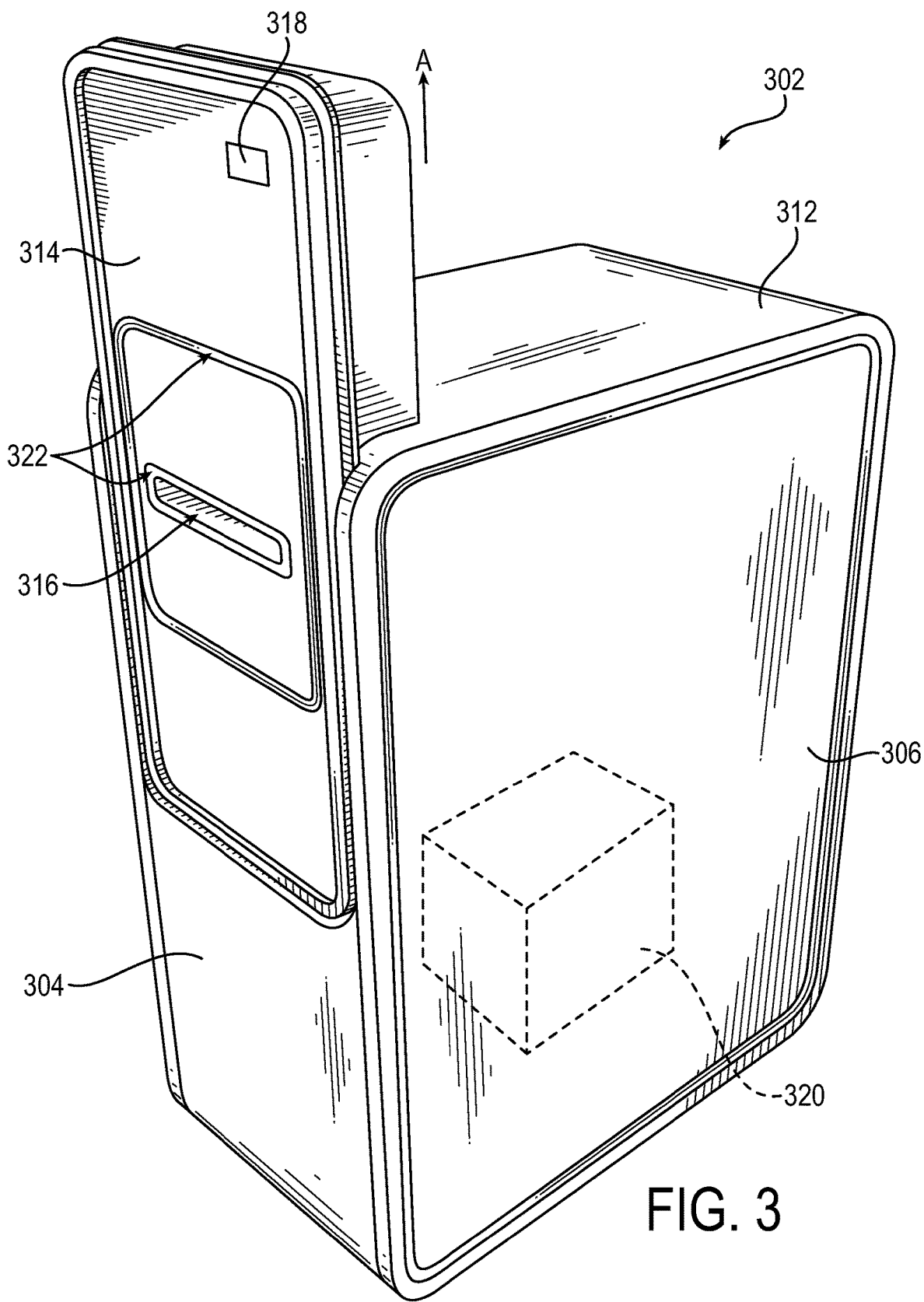
FIG. 3 is a right-front perspective view of an automated-transaction-machine embodiment.
Figure 4:
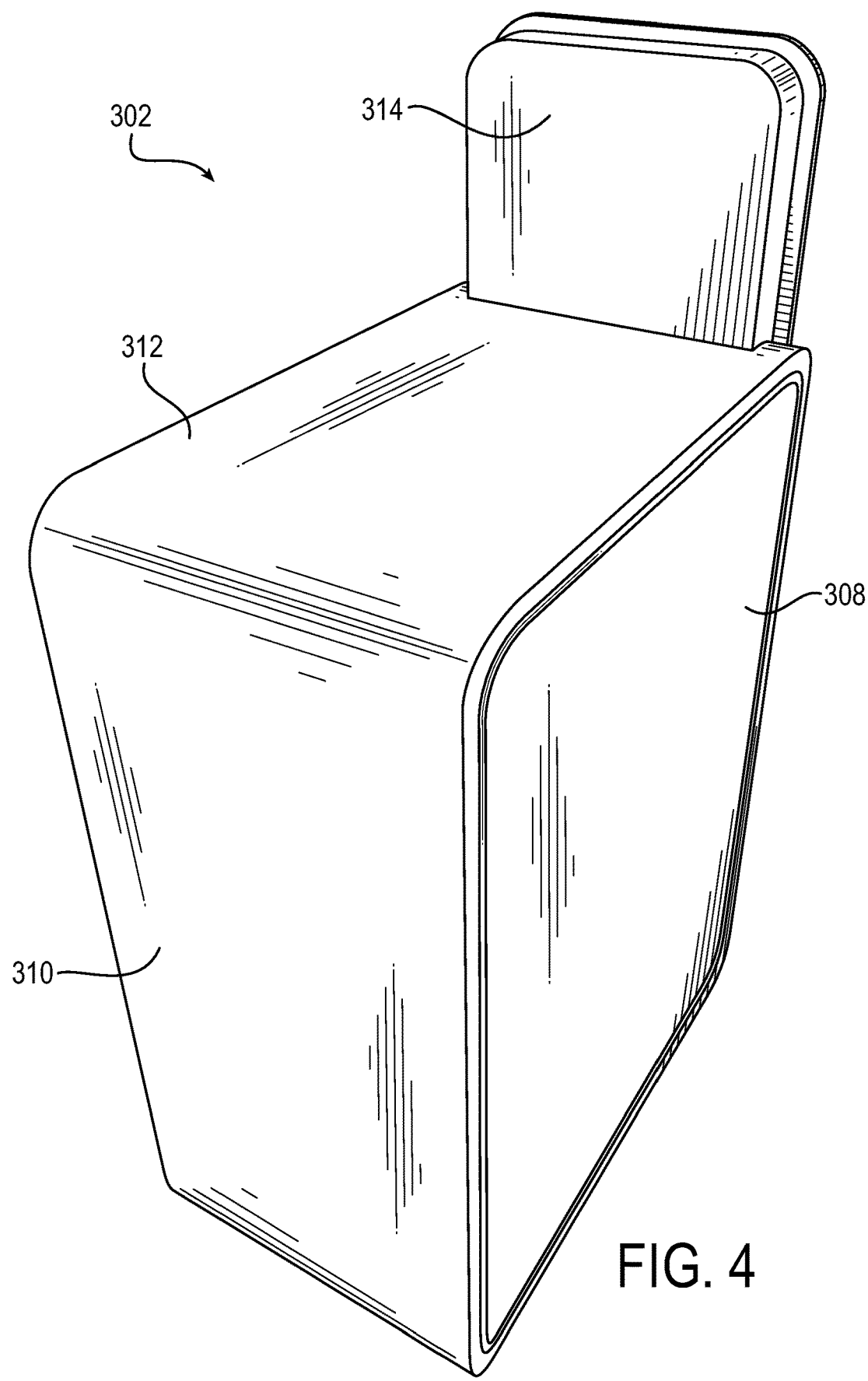
FIG. 4 is left-back perspective view of an automated-transaction-machine embodiment.
Figure 5:
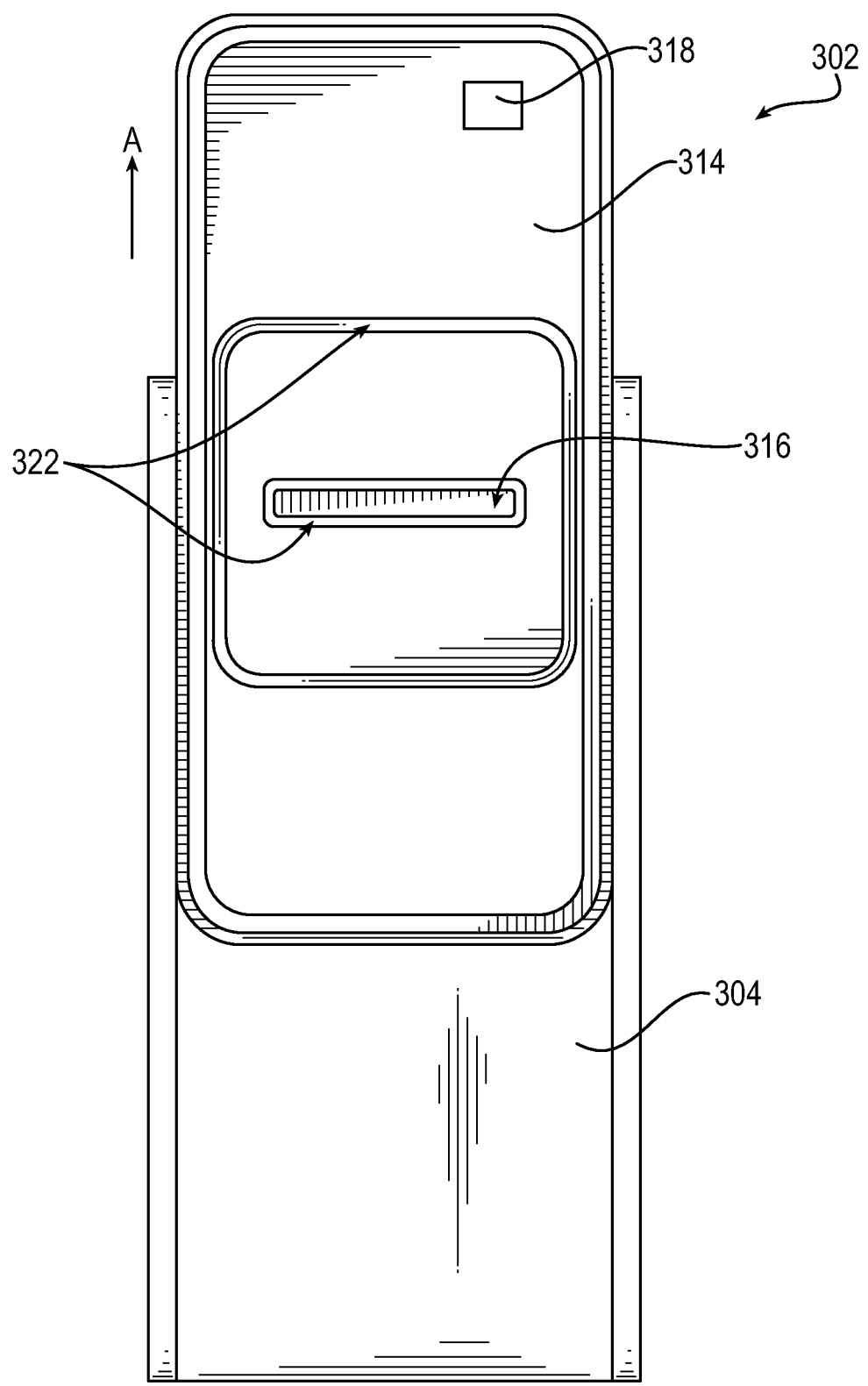
FIG. 5 is a front view of an automated-transaction-machine embodiment.
Figure 6:
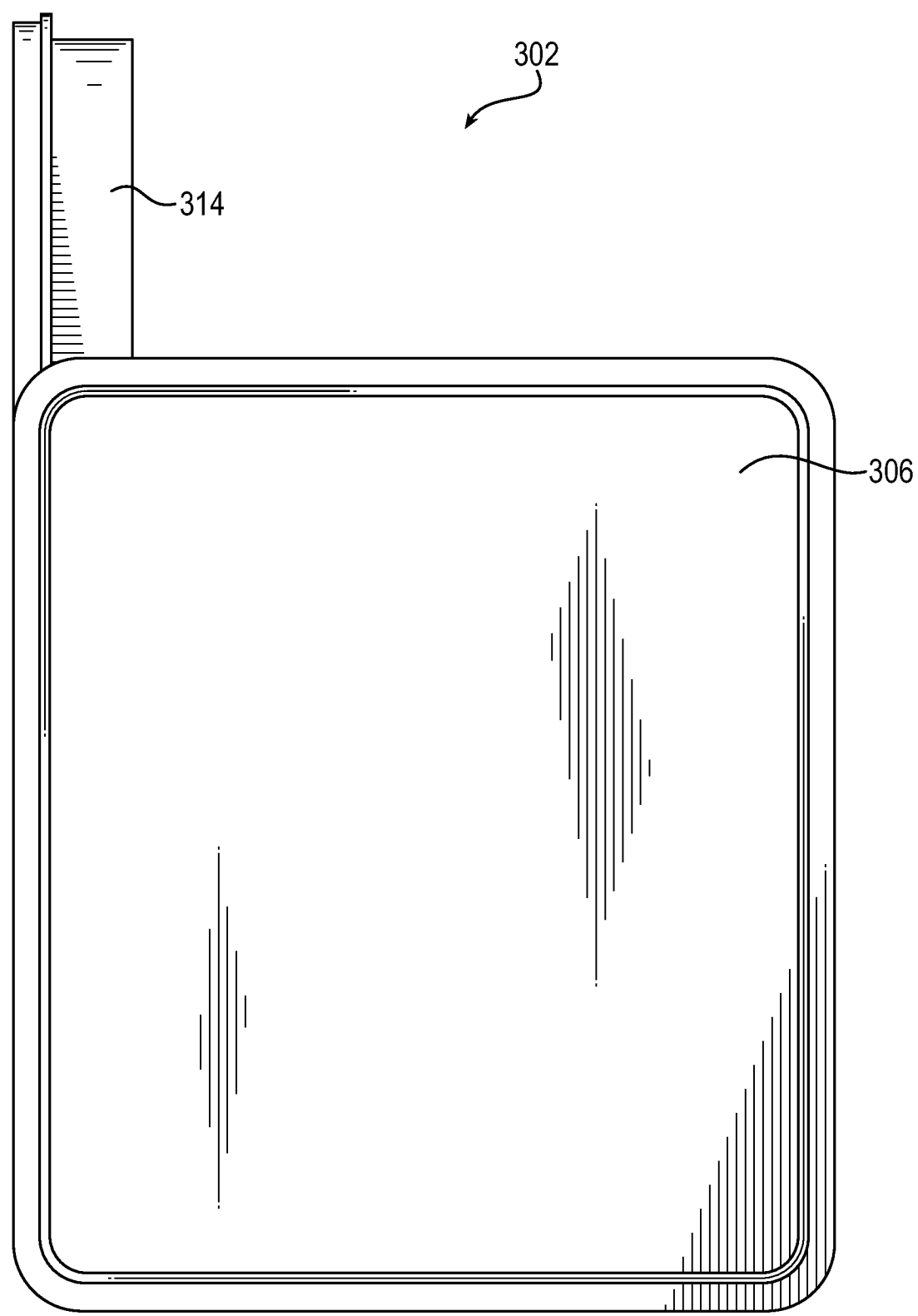
FIG. 6 is view of the right side of an automated-transaction-machine embodiment.
Figure 7:
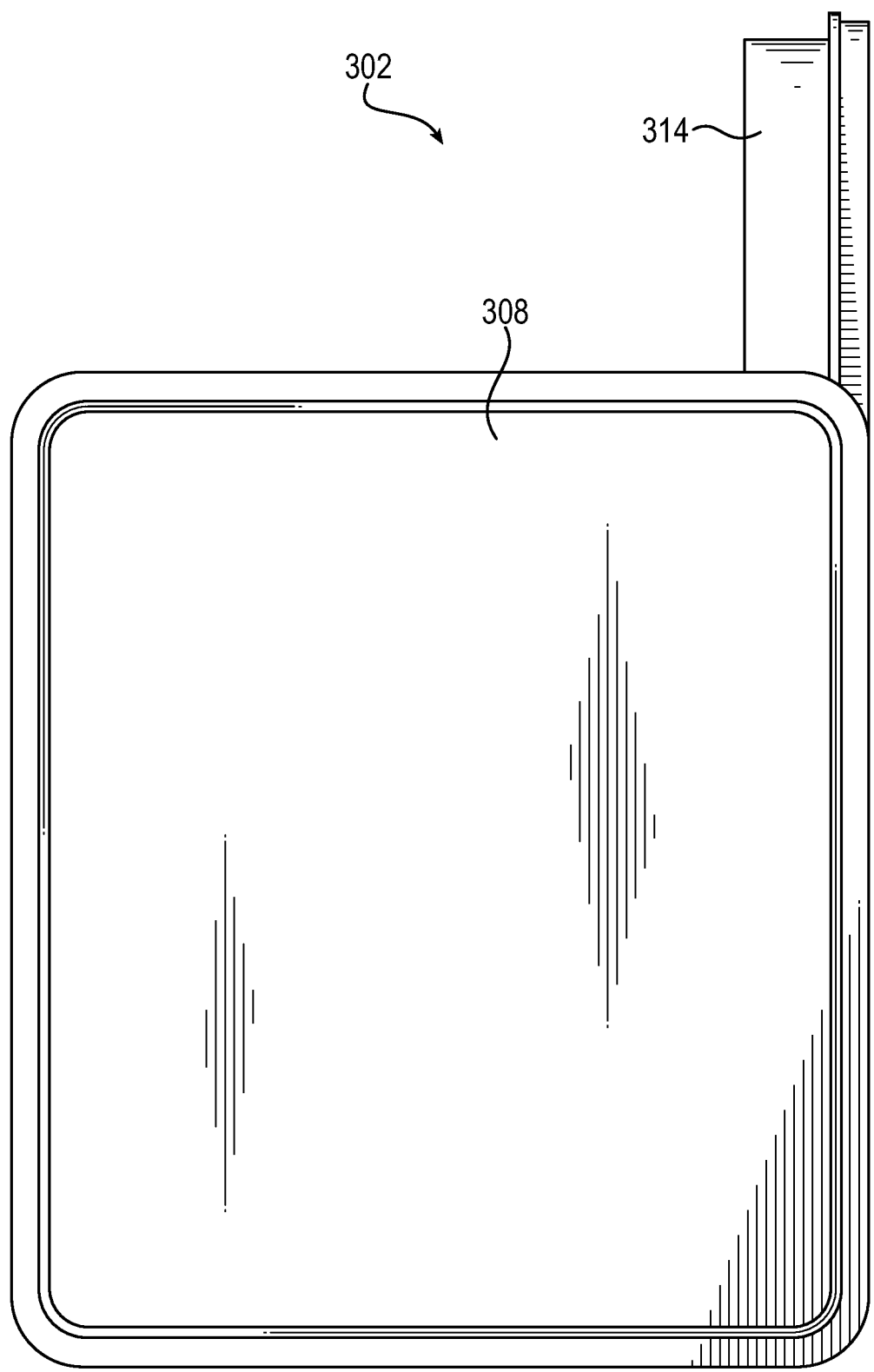
FIG. 7 is view of the left side of an automated-transaction-machine embodiment.
Figure 8:
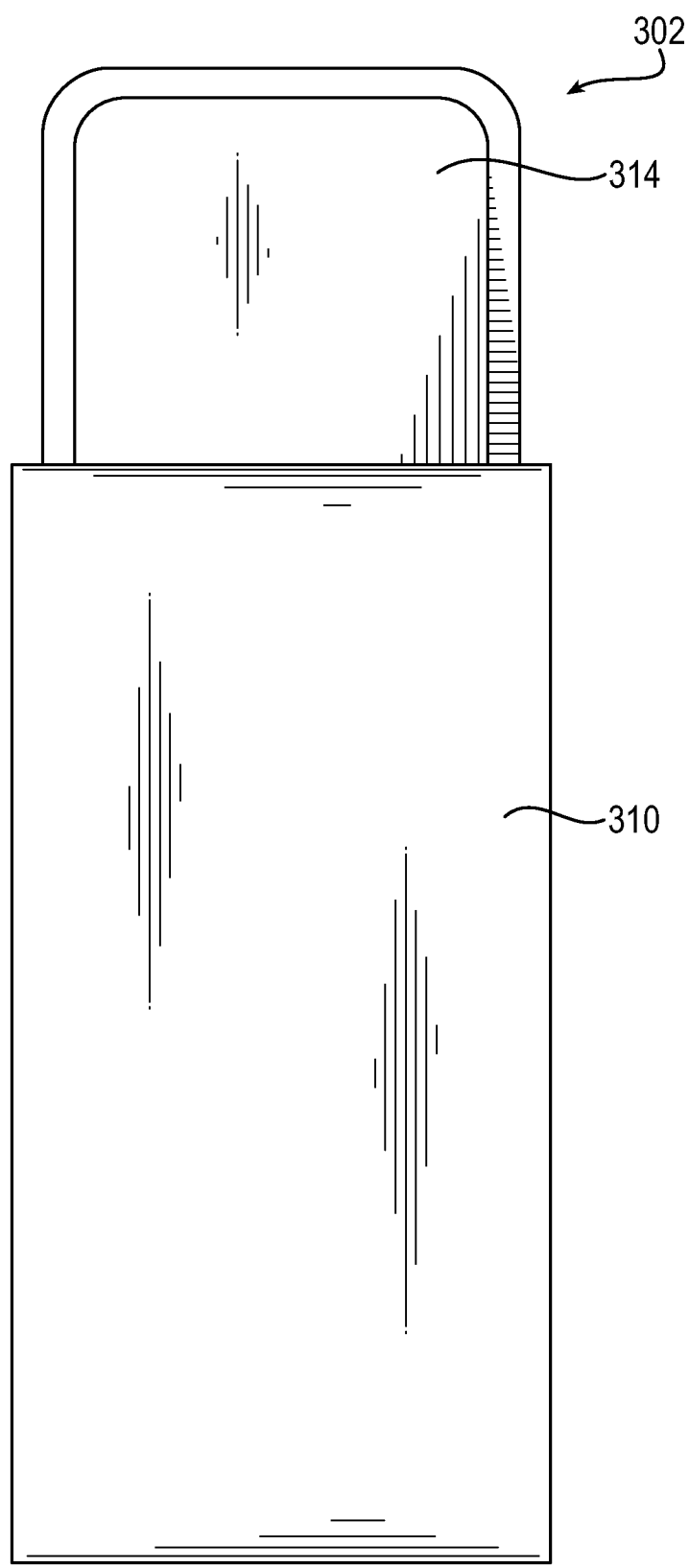
FIG. 8 is a back view of the design of an automated-transaction-machine embodiment.
Figure 9:
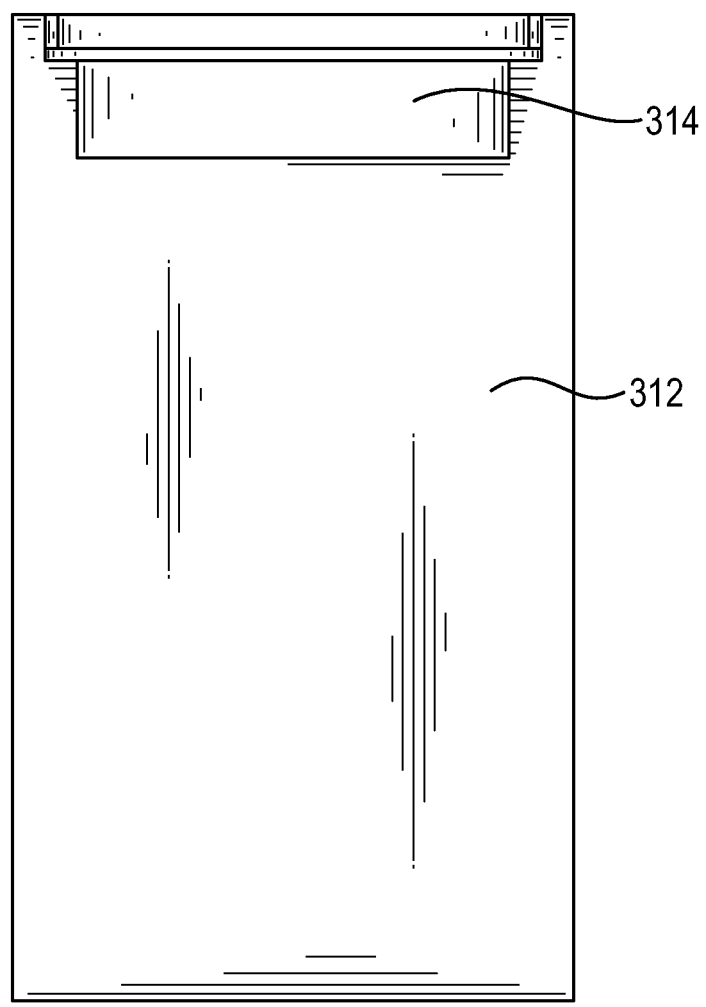
FIG. 9 is a top view of an automated-transaction-machine embodiment.
Figure 10A:
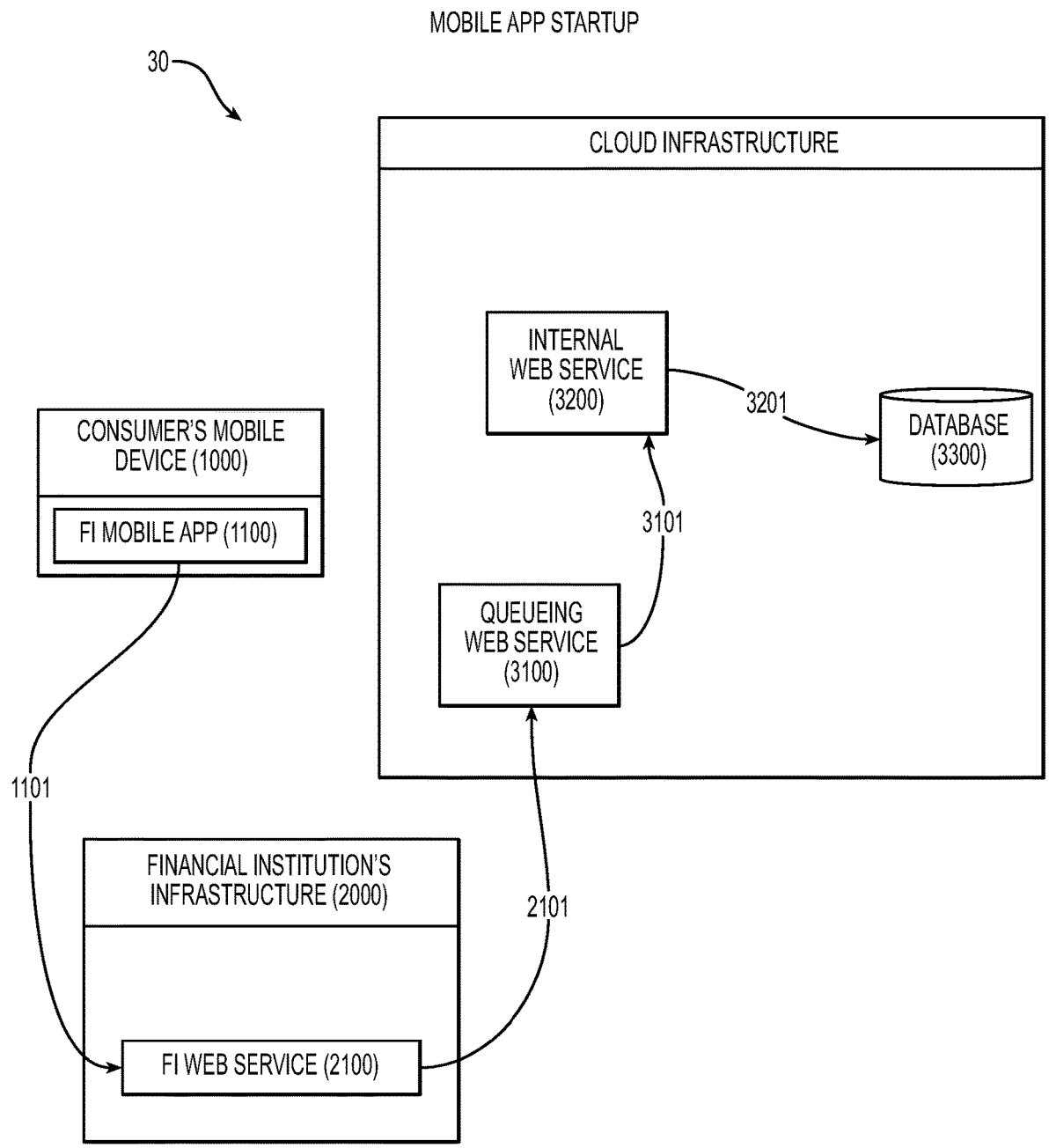
FIG. 10A is a flow diagram generally showing a mobile-application-startup data path.
Figure 10B:
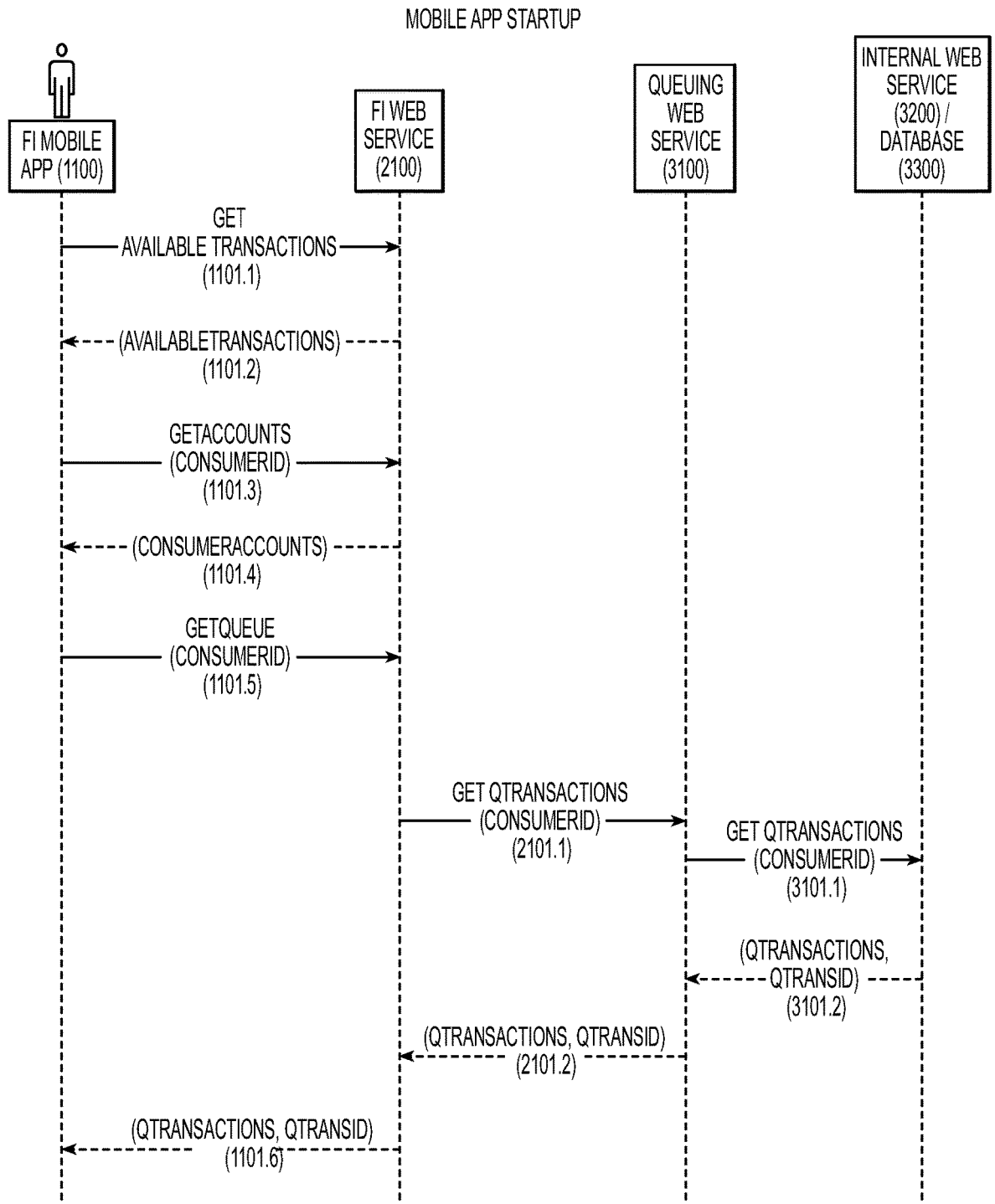
FIG. 10B is a data-flow diagram generally showing the flow of data exchanges between components during mobile-application startup.
Figure 11A:
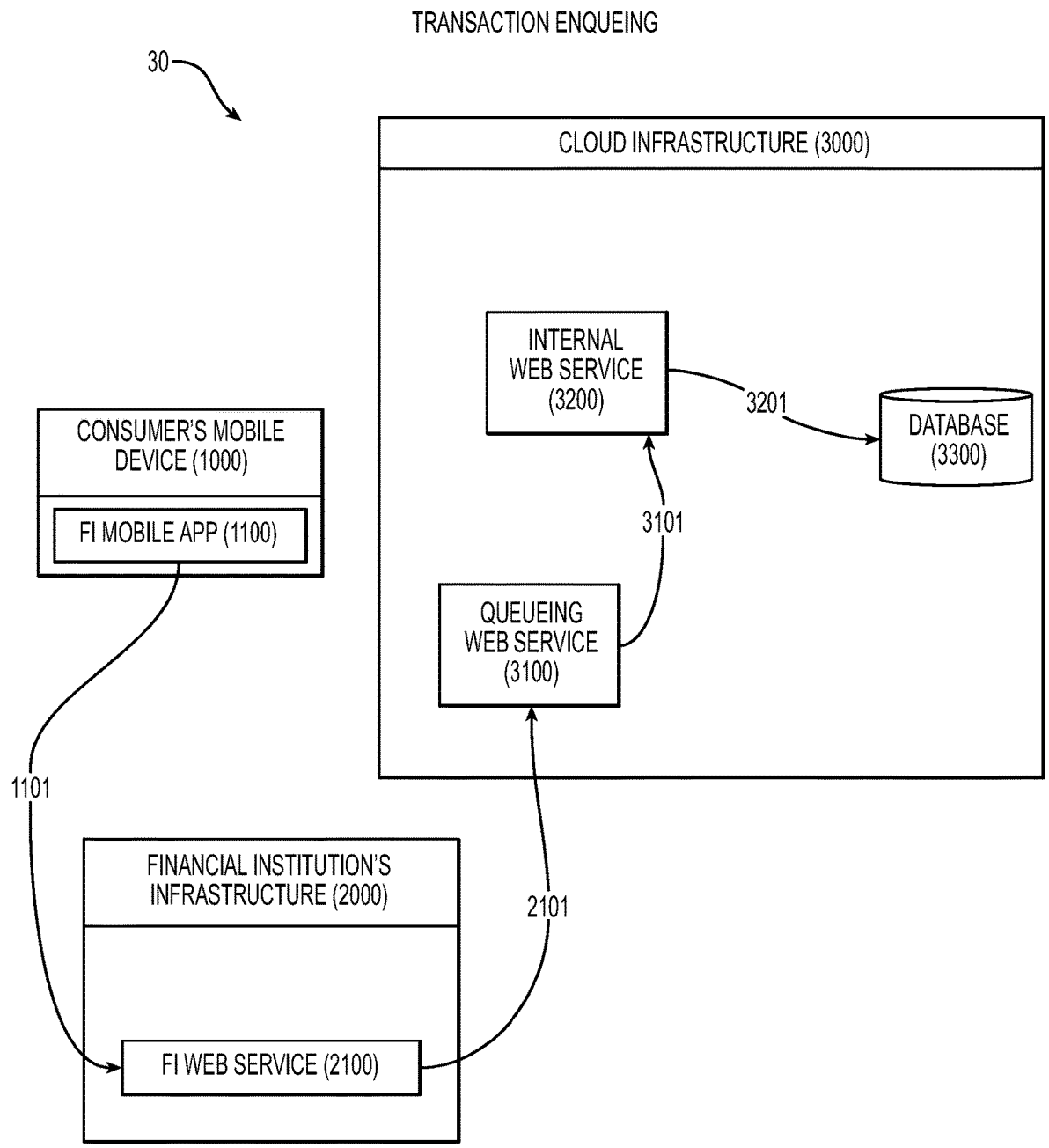
FIG. 11A is a flow diagram generally showing a transaction-enqueuing data path.
Figure 11B:
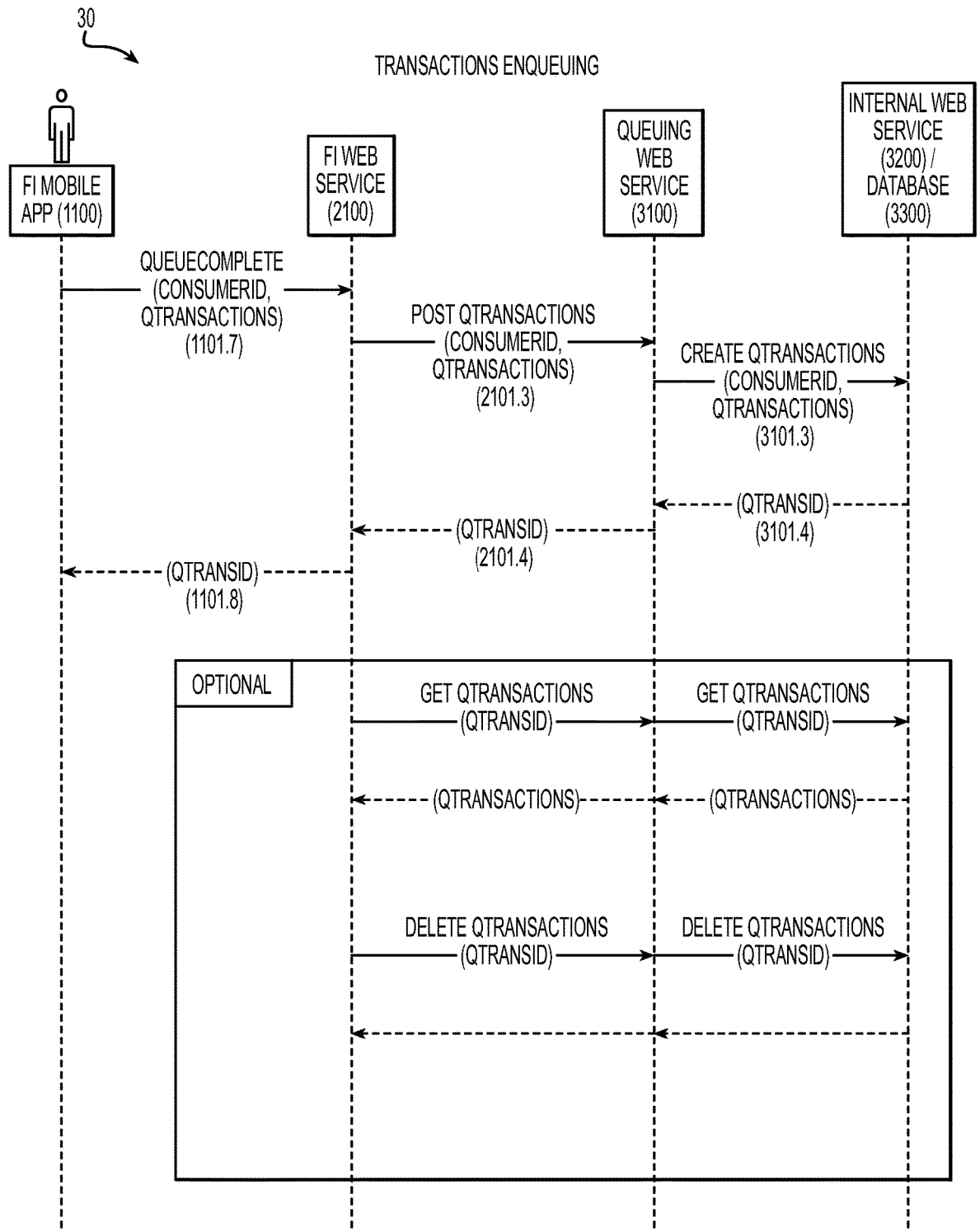
FIG. 11B is a data-flow diagram generally showing the flow of data exchanges between components during transaction enqueuing.
Figure 12A:
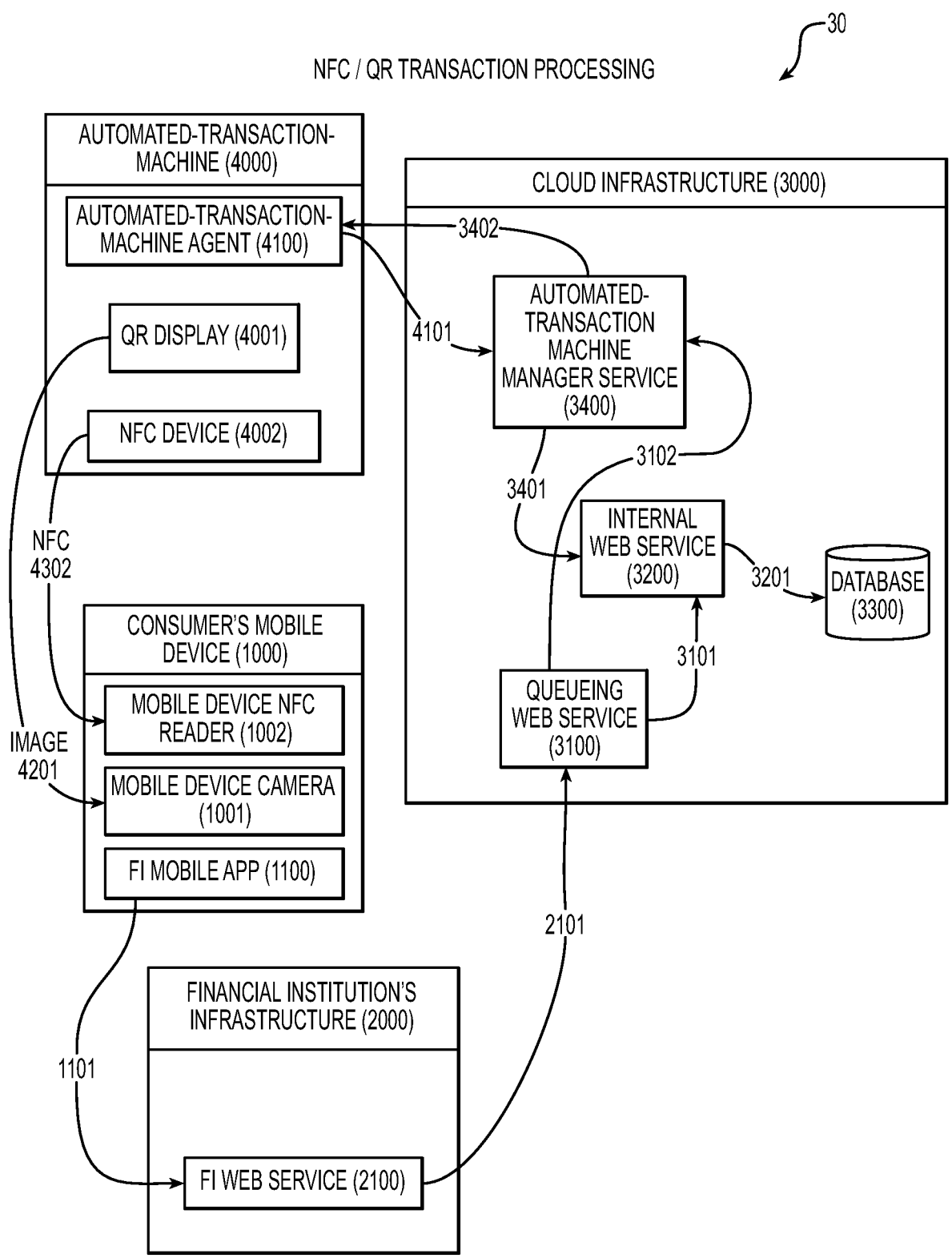
FIG. 12A is a flow diagram generally showing a near-field-communication/quick-response-code transaction-processing data path.
Figure 12B:
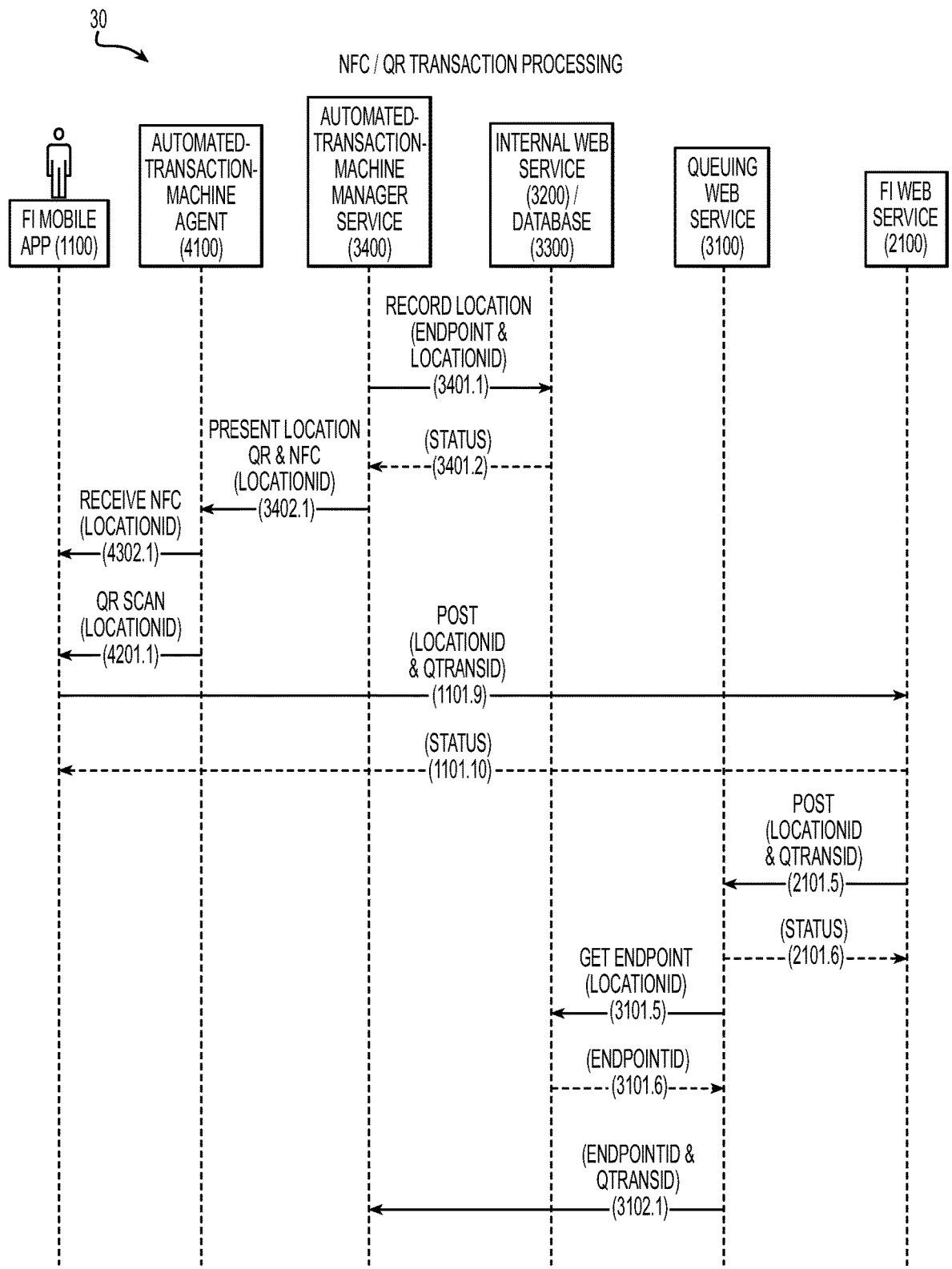
FIG. 12B is a data-flow diagram generally showing the flow of data exchanges between components during near-field-communication/quick-response-code transaction processing.
Figure 13A:
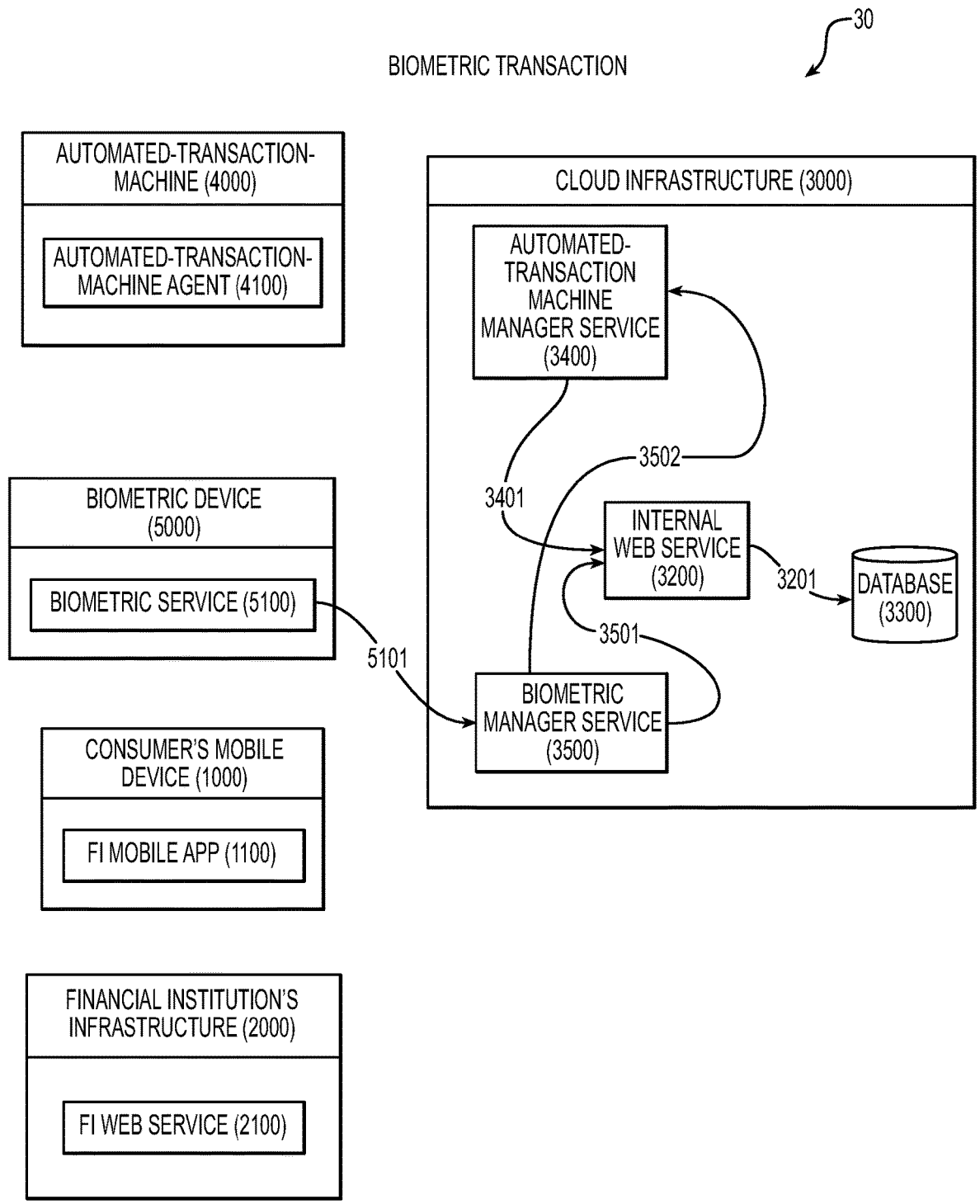
FIG. 13A is a flow diagram generally showing a biometric-transaction data path.
Figure 13B:
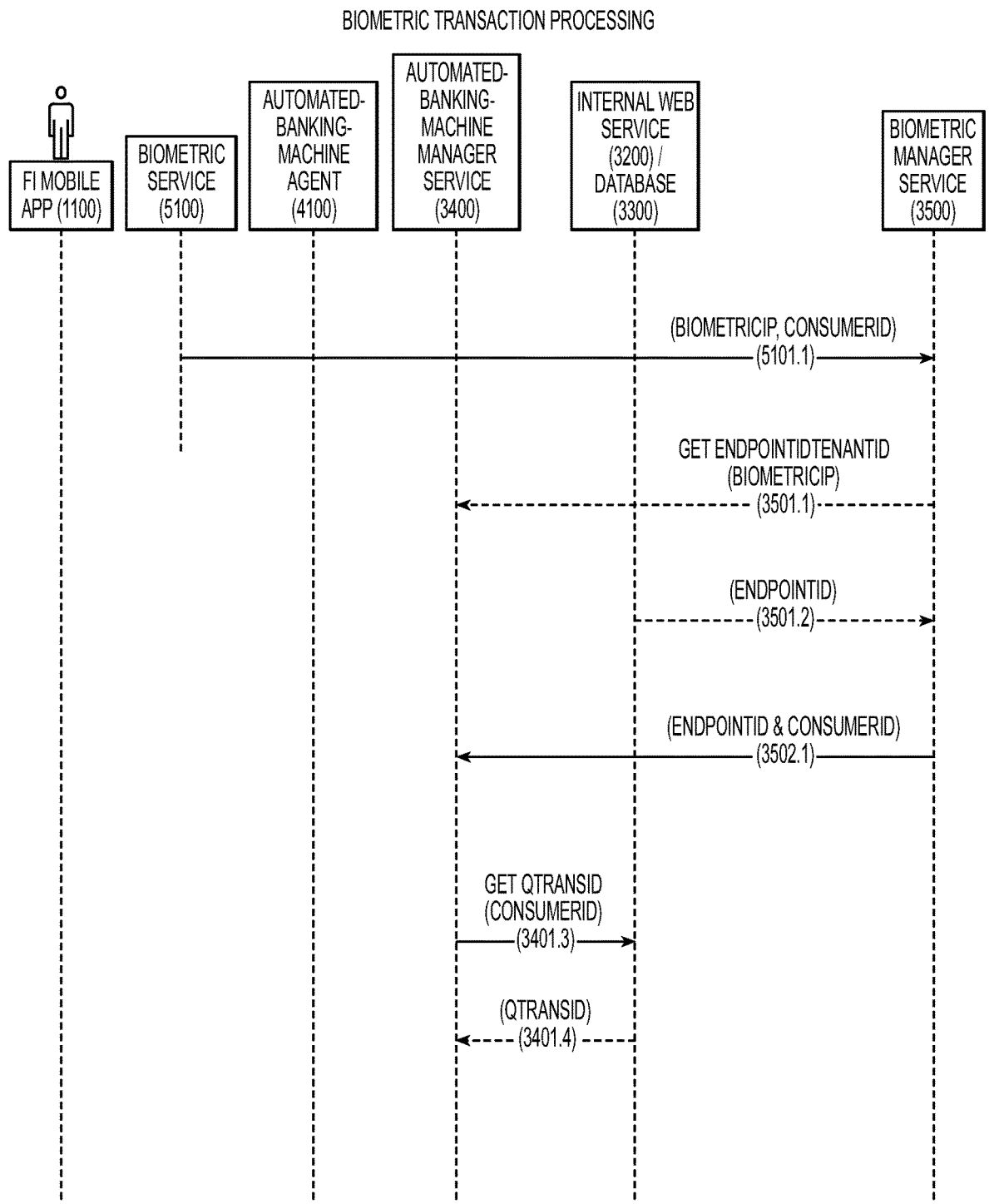
FIG. 13B is a data-flow diagram generally showing the flow of data exchanges between components during a biometric transaction.
Figure 14A:
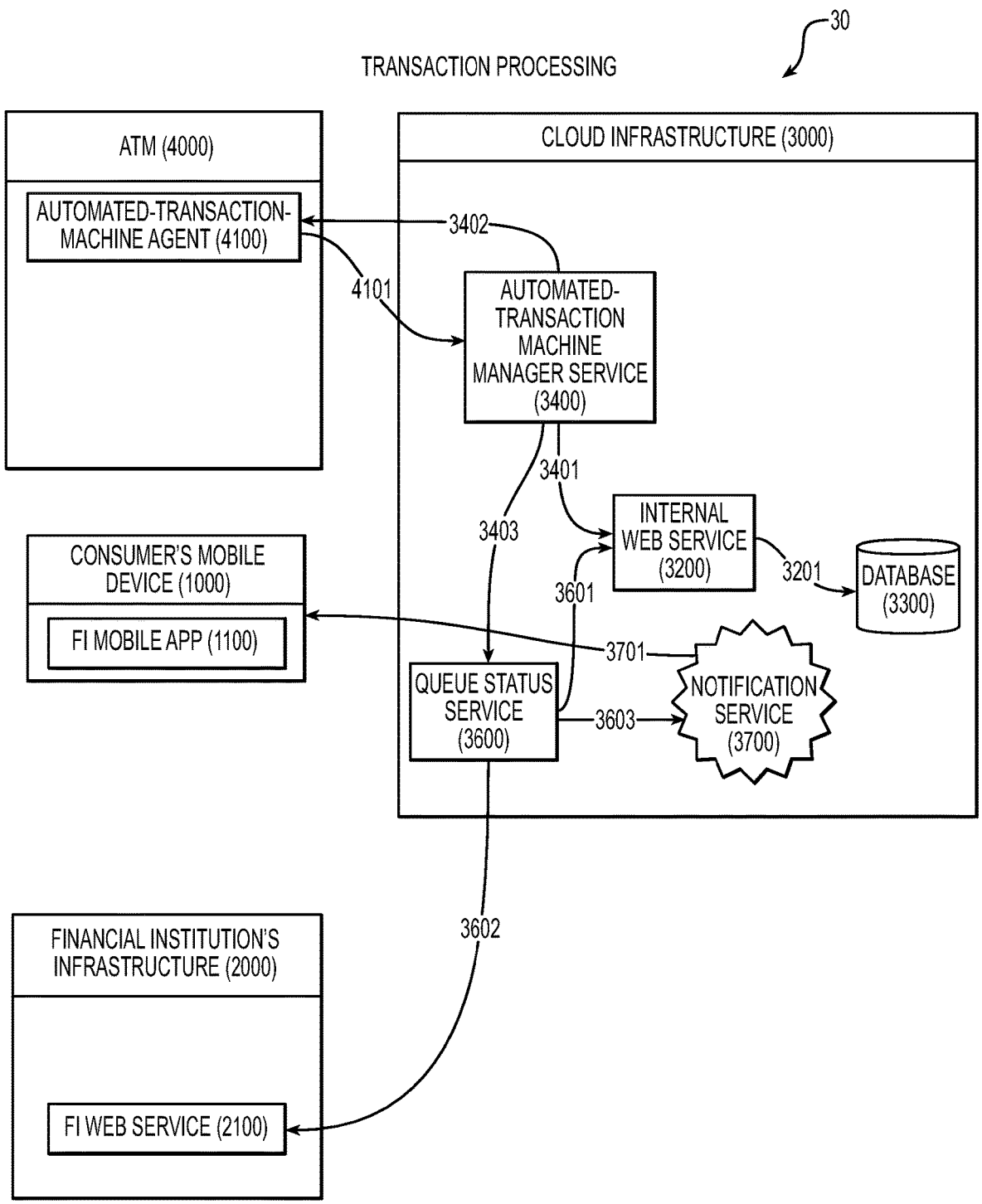
FIG. 14A is a flow diagram generally showing a transaction-processing data path.
Figure 14B:
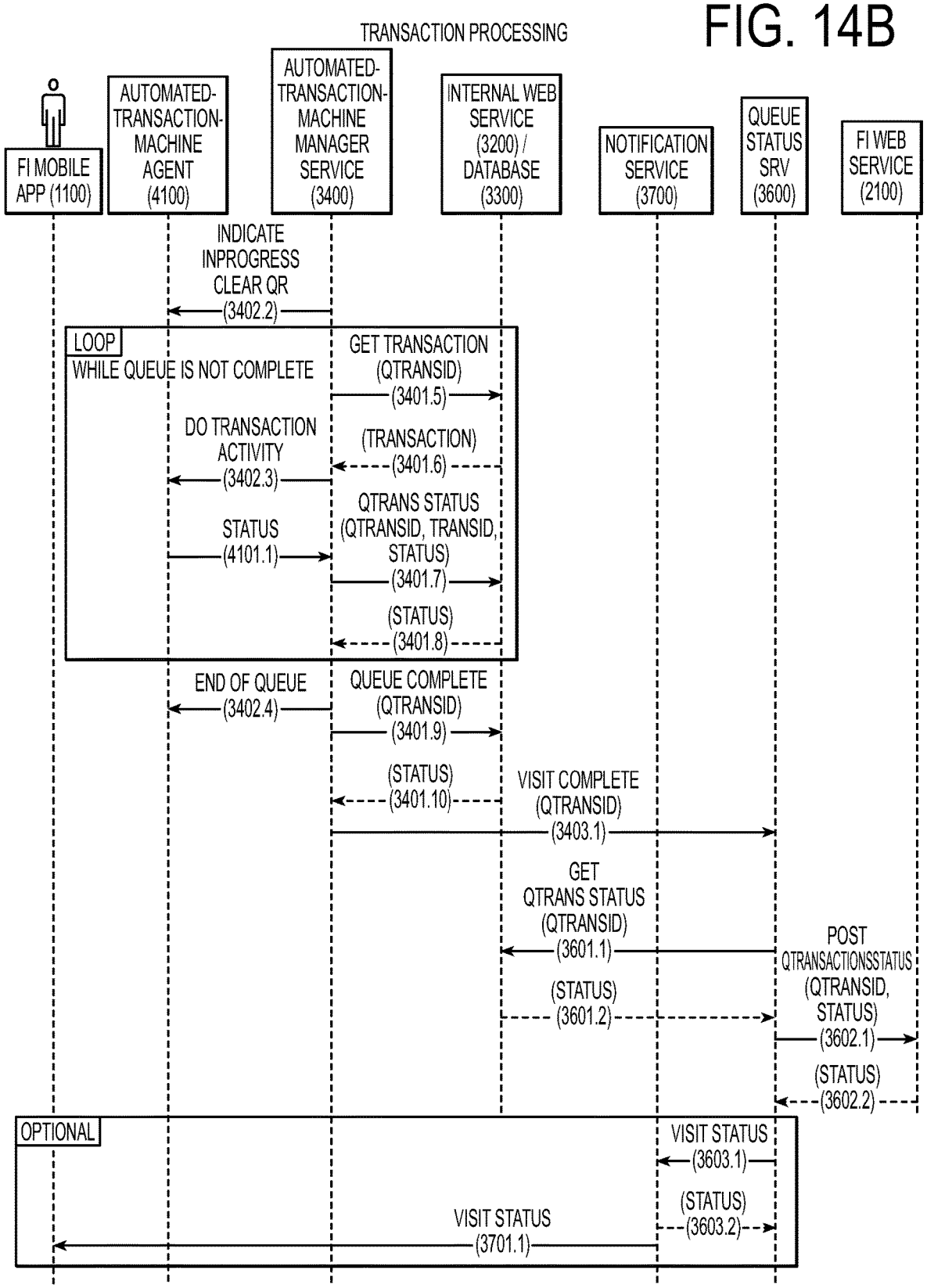
FIG. 14B is a data-flow diagram generally showing the flow of data exchanges between components during transaction processing.

In other configurations and as illustrated in FIG. 2, the system 1 for onboarding of banking-account information further includes a token platform 17. The token platform 17 creates tokenized data of one of more of: the customer-device identification 12, the banking-account information and the verification input where the account data is the tokenized data. The system 1 may also include a software application 20 and/or a device-validation engine 19. The software application 20 is downloaded onto the mobile-customer device 13 and is used to request the future-banking transactions from the mobile-customer device 13. In some configurations, the software application 20 may be password or PIN protected to provide a level of security preventing someone that is not an owner of the mobile-customer device 13 or of the banking-account information on the banking card 3 from accessing the software application 20. The tokenized platform 17 interrogates the device-validation engine 19. When there is a successful interrogation, the token platform 17 provides the mobile-customer device 13 with a link for downloading the software application 20 to the mobile-customer device 13. The device-validation engine 19 may perform the interrogation by determining if one or more of the customer-device identification 12 and the banking-account information 4 are consistent with a corresponding name in a pre-known billing record. For example, the pre-known billing record may be a mobile network operator (MNO) billing record that may be provided by a telecommunications service provider organization that provides wireless voice and data communication for its customers.

FIGS. 3-16 illustrate various components, communications, and aspects of an example system 300. Embodiments of the system 300 are generally described in the context of computer-readable logic executed by one or more general-purpose computers. For example, in a portion of an embodiment, computer readable logic is stored on a server computer system and is accessed by a client computer via a communications link or a network, such as an intranet, Internet, virtual private network, or another computer network. Because the basic structures and functions related to computer-readable routines and corresponding implementations are known, they have not been shown or described in detail below to avoid unnecessarily obscuring the described embodiments.

Embodiments are generally directed to automated transaction machines (ATM) and related methods. Very generally, embodiments are directed to automated-transaction-machine financial transactions that no longer require traditional automated-teller-machine hardware components because a user's mobile device is being used to facilitate the functionality provided by traditional automated-transaction-machine hardware components. As a non-limiting example, a user's mobile device is used to view the financial-transaction data, pre-stage ATM transactions, initiate pre-staged automated-transaction-machine transactions, input much of the user data that was previously input using traditional automated-transaction-machine components such as an automated-transaction-machine card reader and an ATM PIN pad.

FIGS. 3-9 illustrate an example ATM 302 (e.g., banking terminal) that has a cash dispenser but does not have a card reader, keypad, nor an alphanumeric screen. The ATM 302 has a front side 304, a right side 306, a left side 308, a back side 310, a top side 312, and a bottom side (not illustrated). The ATM 302 includes a front panel 314 that may slide upward in the direction of arrow A when the ATM 302 is to be placed in operation. The front panel may include an elongated orifice/opening 316 through which paper currency (cash) may be dispensed to a banking customer, for example. Some embodiments may also include a biometric sensor 318, an internal vault for storing paper currency, and/or light emitting diodes LEDs 322 recessed into the front panel 314 around the opening 316. As shown by FIGS. 3-9, the LEDs 322 are the only structures of the ATM 302 that emit light.

Figure 16:
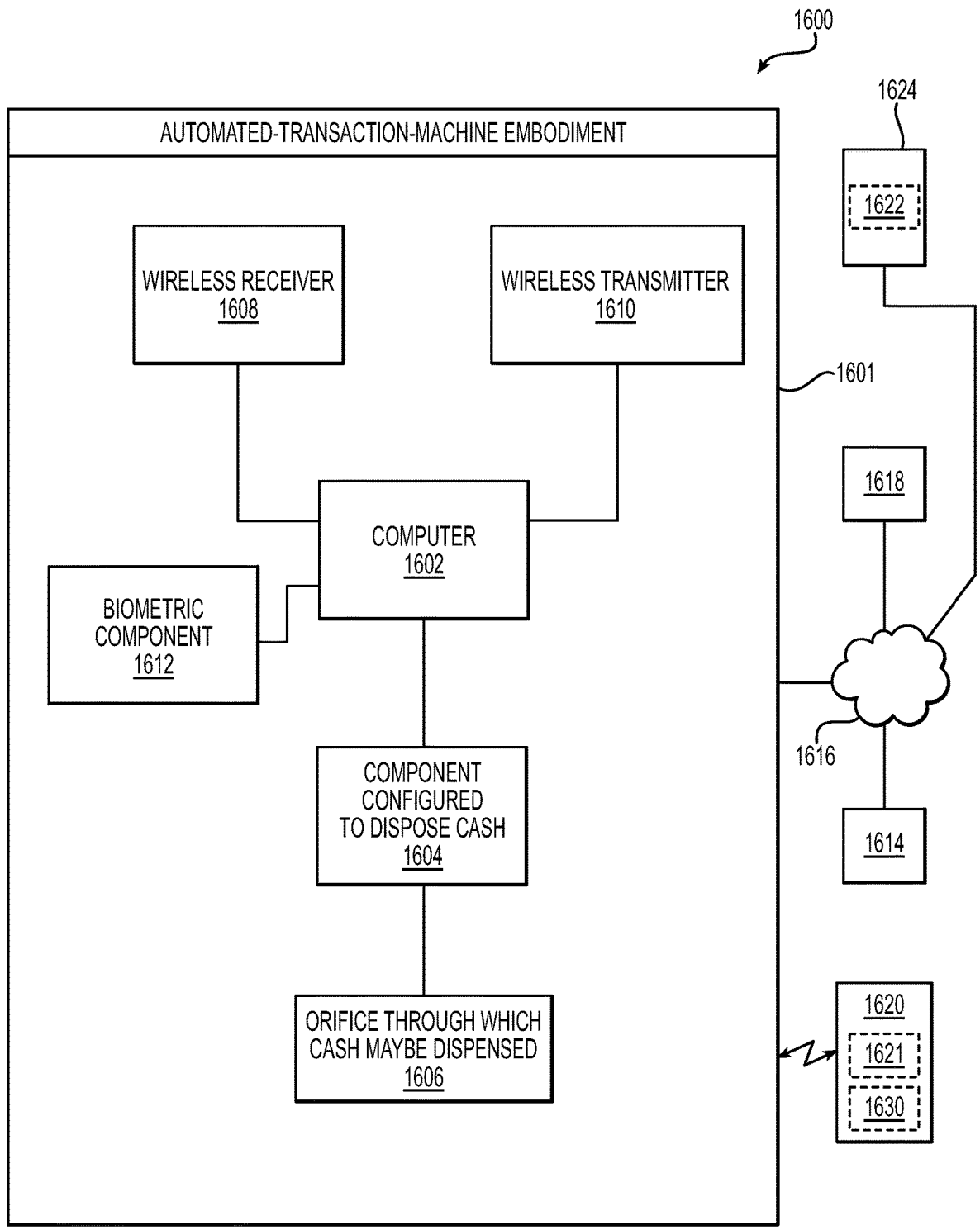
FIG. 16 is a schematic showing components included in an Automated-Transaction-Machine embodiment.

FIG. 16 illustrates more detail of the example ATM of FIGS. 3-9. Various embodiments include an ATM 1600 (FIG. 16) that includes: a housing 1601, a computer 1602 (e.g., processor), a component 1604 configured to dispense cash with an orifice 1606 through which cash may be dispensed, a wireless transmitter 1610, a wireless receiver 1608. The ATM 1600 may not include a screen that may display alphanumeric characters, a card reader to read card data that can be used to identify a financial account. The machine may also not include a printer, may not include a component for dispensing paper receipts, and/or may not include user-interface buttons or may have a limited number of user-interface buttons.

In at least one embodiment, the ATM 1600 may be a cash-dispensing banking terminal. The banking terminal 1600 may have a housing 1601, a transmitter 1610, a receiver 1608, a cash dispenser 1604, and a processor 1602 configured to at least partially control the cash dispenser 1604. A pre-created banking transaction request 1632 was earlier created using a mobile device 1620 before a banking customer and the mobile device 1620 arrive at the cash-dispensing banking terminal 1600. A remote computing device 1614 authenticates and authorizes the pre-created banking transaction request 1623 before the banking customer and the mobile device 1620 arrive at the cash-dispensing banking terminal 1600. When the pre-created banking transaction request 1623 is authenticated and authorized, a remote computer generates an executable transaction request 1622 and also generates and sends a transaction identifier 1621 associated with an executable transaction request 1622 to the mobile device 1620. The executable transaction request 1622 may be stored in a remote memory 1624 connected to the network 1616 so that it may later be retrieved and executed/performed. The receiver 1608 will receive the transaction identifier 1621 from the network 1616. When the banking customer is at the banking terminal 1600, the remote computing device 1614 or another device will verify if the transaction identifier 1621 is valid. When valid, the banking terminal 1600 will perform the executable transaction request 1622 while the banking customer is at the banking terminal 1600.

In some embodiments, the pre-created banking transaction request 1632 includes a request to dispense an amount of currency from the banking terminal 1600. The amount of currency may pre-deducted from a banking account of the banking customer before the banking customer is at the banking terminal 1600. The transaction identifier 1621 may be valid for a limited time and after the limited time the transaction identifier 1621 is void and the executable transaction request 1622 will not be performed. For example, the limited time is two hours or less.

In one or more embodiments, the banking terminal 1600 is an automatic transaction machine (ATM) lacking a keypad, lacking a card reader, and lacking user interface buttons. The banking terminal 1600 may also be an ATM and lack a keypad and lack a card reader. The receiver 1608 may receive the transaction identifier 1621 using wireless near field communication (NFC) traveling a distance of three feet or less, and the transmitter 1610 may be an NFC wireless transmitter 1610.

In some embodiments, one method of operation of the banking terminal 1600 may include time limited secure transactions. For example, a secure financial transaction may be complete in 10 seconds or less. Such a transaction may include cash dispensing.

The banking terminal 1600 may have a reduced footprint (width and/or depth) as compared to the height of the banking terminal 1600. For example, the banking terminal 1600 may have a depth up to 32% less than a standard banking terminal 1600 and a width up to 37% less than a standard banking terminal 1600.

In some embodiments may contain other useful features or components. For example, software 1630 in the mobile device 1620 communicates with the remote computing device 1614 to authenticate and authorize the pre-created banking transaction request 1623 before the banking customer and the mobile device 1620 arrive at the cash-dispensing banking terminal 1600. The transaction identifier 1621 be formed with a bar code, a biometric input collected at a biometric component 1612, a quick response (QR) code, and/or a symbol. In some embodiments, the mobile device 1620 is a mobile phone. The receiver 1608 may receive the transaction identifier 1621 from the mobile device 1620 when the mobile device 1620 is tapped against the banking terminal 1600. The banking terminal 1600 may contain a vault that may be loaded with the cash and have the capability to dispense cash responsive to the executable transaction request 1622. In other configurations, the mobile device 1620 has no communications with the banking terminal 1600 until after the transaction identifier 1621 and executable transaction request 1622 are created.

Some embodiments may have a light emitting diode (LED) lighting 322 (FIG. 3) illuminate a first color when no transaction identifier 1621 has been received, when the transaction identifier 1621 is invalid. When no banking transaction is being processed the LED lighting may be illuminated with a second color that is different than the first color. Also, the LED lighting may also be illuminated to another color when the transaction identifier 1621 has been received, when the transaction identifier 1621 is valid, and/or when the banking transaction is being processed.

FIGS. 10-15 illustrate the physical components, computer logic, data paths, and data transfers of the example system 300 in more detail. The physical components, computer logic, data paths, and data transfers are each respectively listed in Tables 1-4 below and correspond to FIG. 10-15. As one of ordinary skill in the art would appreciate and understand these tables, all but a few of the table entries are not further explained outside of a corresponding table.

TABLE 1

| Physical Elements |
|---|
| 1000 Consumer's Mobile Device - non-limiting embodiments include a smart phone or tablet compatible with a financial-institution mobile application. |
| 1001 Mobile Device Camera - non-limiting embodiments include a consumer's mobile-device camera. |
| 1002 Mobile Device NFC Reader - non-limiting embodiments include a near-field- communication reader embedded in a user's mobile device. |
| 2000 Financial Institution's Infrastructure - non-limiting embodiments include computer resources associated with a financial institution. |
| 3000 Cloud Infrastructure - non-limiting embodiments include remote computer resources used to support computing services. |
| 4000 Automated-Transaction-Machine Embodiment - An automated-transaction-machine embodiment as described herein. |
| 4001 QR Display - non-limiting embodiments include a QR code presentation device on an automated-transaction-machine embodiment. |
| 4002 NFC Device - non-limiting embodiments include a near-field-communication transceiver on an automated-transaction-machine embodiment. |
| 5000 Biometric Device - either i) a component of, or ii) a device located at, an automated-transaction-machine embodiment used to determine a consumer's identity from a consumer's biometric feature. |

TABLE 2

| Computer-Readable Logic |
|---|
| 1100 Financial-Institution (FI) Mobile Application - A mobile application provided by a financial institution that executes on a consumer's mobile device. |
| 2100 Financial-Institution Web Service - A web service provided by a financial institution that authenticates and authorizes incoming communications from the FI Mobile App and the cloud Infrastructure; the Service approves queued transactions; the Service is notified of completion of queued transactions; the service will forward, from the FI Mobile Application, specified location ids and queue ids to the Queuing Web Service. |
| 3100 Queuing Web Service - A web service that manages queue creation and deletion. In an embodiment, the service receives requests from the FI Web Service to process queues for a specified location and queue. The Service may request the ATM Manager Service process a specified queue for processing at an endpoint. |
| 3200 Internal Web Service - A web service used to interface to the Database by all services. |
| 3300 Database - The data storage for all data including configuration, queues, automated-transaction-machine status and mapping tables. |

TABLE 2-continued

| | Computer-Readable Logic |
|---|---|
| 3400 | Automated-Transaction-Machine Manager Service - A service hosted in the Cloud Infrastructure to manage the interactions with one or more Automated-Transaction-Machine Agents. |
| 3500 | Biometric Manager Service - A Service hosted in the Cloud Infrastructure to manage the receipt of notifications from the Biometric Service that a consumer has been identified. The ConsumerId is received in the notification and the service gets the EndPointId from the biometric device IP associated with notification. The EndPointId and ConsumerId define which Automated-Transaction-Machine embodiment a specific consumer is visiting. The Service sends a message to the Automated-Transaction-Machine Manager Service with the EndPointId and ConsumerId. |
| 3600 | Queue Status Service - The Service hosted in the Cloud Infrastructure to report status of queue processing; the Service receives messages from the Automated-Transaction-Machine Manager Service; the QS Service uses the received QTransId to request the queue status; the QS Service posts to queue status to the FI Web Service; the QS Service sends information for each transaction to the Notification Service. |
| 3700 | Notification Service - The web service hosted in the Cloud Infrastructure that can request SMS or email notification be sent to a consumer. |
| 4100 | Automated-Transaction-Machine Agent - The agent in the Automated-Transaction-Machine Embodiment that processes commands from the Automated-Transaction-Machine Manager Service. The agent establishes a messaging connection to the Automated-Transaction-Machine Manager Service on startup. The Agent will receive messages from the Automated-Transaction-Machine Manager Service to control the hardware. The Agent sends messages to the Automated-Transaction-Machine Manager Service to report command and hardware status. The Agent controls indicator lights, displays QR codes and controls the NFC transceiver. |
| 5100 | Biometric Service - The service contained in the biometric device which notifies the Biometric Manager Service of a consumer's identity; the service sends a ConsumerId. |

In more detail, one embodiment of the Financial-Institution (FI) Mobile Application authenticates and authorizes the consumer's use of the application to perform financial-transaction functions. The application may allow the user to select a financial transaction allow the consumer to select an account associated with the financial transaction. The application, in some embodiments, allows the consumer to provide transaction-specific information. For example, mobile camera may be used to image a QR code displayed on the automated-transaction-machine's QR Display. The QR image may then be interpreted to receive the location ID of the automated-transaction-machine. In another example, a mobile device NFC reader is used to receive a location ID from an NFC device transceiver to receive the location ID of a visited automated-transaction-machine and informs the FI Web Service of the visit.

The automated-transaction-machine manager service in one embodiment creates a unique location ID that is refreshed at a specific interval or after each consumer visit to an automated-transaction-machine endpoint. The manager service provides the location ID to an automated-transaction-machine agent and receive requests to process a specified queue at a specified endpoint. The queue may be specified by the QTransId that is received from the queuing web service for NFC or QR initiated transaction processing or by requesting the current active queue from the ConsumerId for biometric initiated transaction processing. In an embodiment, when a transaction is in process for an individual automated-transaction-machine embodiment, the automated-transaction-machine manager service commands the automated-transaction-machine agent to change the lighting pattern, clear the QR code, and turn off the NFC transceiver. The automated-transaction-machine manager service may process each transaction in the queue by sending one or more messages to the automated-transaction-machine agent. The automated-transaction-machine manager service may receive one or more messages from the automated-transaction-machine agent in response. The automated-transaction-machine manager service may receive unsolicited status messages from the automated-transaction-machine agent. The service updates the status of a transaction after processing and sends a message to the automated-transaction-machine agent when the processing of a queue has completed. The service also updates the status of a queue after processing has completed may send a message to the queue status service when the processing of a queue has completed.

TABLE 3

| | Data Paths |
|---|---|
| 1101 | FI Mobile Application to FI Web Service web service communication. |
| 2101 | FI Web Service to Queuing web service communication. |
| 3101 | Queuing Service to Internal Service web service communication. |
| 3102 | Queuing Service to Automated-Transaction-Machine Manager Service message communication. |
| 3201 | Internal Web Service to Database. |
| 3401 | Automated-Transaction-Machine Manager Service to Internal Service web-service communication. |

TABLE 3-continued

Data Paths

| | |
|---|---|
| 3402 | Automated-Transaction-Machine Manager Service to Automated-Transaction-Machine Agent message communication. |
| 3403 | Automated-Transaction-Machine Manager Service to Queue Status Service message communication. |
| 3501 | Biometric Manager Service to Internal Service web-service communication. |
| 3502 | Biometric Manager Service to Automated-Transaction-Machine Manager Service message communication. |
| 3601 | Queue Status Service to Internal Service web-service communication. |
| 3602 | Queue Status Service to FI Web Service web-service communication. |
| 3603 | Queue Status Service to Notification Service web-service communication. |
| 3701 | Notification Service to Consumer Mobile Device email or SMS communication. |
| 4101 | Automated-Transaction-Machine Agent to Automated-Transaction-Machine Manager Service message communication. |
| 4201 | QR Display to Mobile Device Camera image presentation. |
| 4302 | NFC Device to Mobile Device NFC Reader wireless near field communication. |
| 5101 | Biometric Service to Biometric Manager Service message communication. |

TABLE 4

Data Transfers

| | |
|---|---|
| 1101.2 | At FI Mobile Application Startup, the app requests the transactions that are available for a consumer from the FI Web Service. |
| 1101.2 | The response from 1101.1 containing the available transactions. |
| 1101.3 | At FI Mobile Application Startup, the app will request the consumer accounts from the FI Web Service. |
| 1101.4 | The response from 1101.3 containing the consumer accounts. |
| 1101.5 | At FI Mobile Application Startup, the app will request any currently active queue for the consumer from the FI Web Service. |
| 1101.6 | The response from 1101.5 containing any currently active queue for the consumer. |
| 1101.7 | When the FI Mobile Application adds to or changes a transaction in a queue, the app will post the transaction to be queued by the FI Web Service. |
| 1101.8 | The response from 1101.8 containing the QtransId for the currently active queue for the consumer. An error may be returned if any of the transactions are not approved. |
| 1101.9 | When the FI Mobile Application receives a location id, the app will post the LocationId and current QTransId to the FI Web Service. |
| 1101.10 | The response from 1101.09 containing the status of the post. |
| 2101.1 | The FI request for any currently active queue for the consumer from the Queuing Web Service. |
| 2101.2 | The response from 2101.1 containing any currently active queue for the consumer. |
| 2101.3 | The FI post to specify the included queue be the active queue for the consumer. |
| 2101.4 | The response from 2101.3 containing the QTransId for the currently active queue. |
| 2101.5 | The FI post to specify a consumer is at a specified ATM to process the specified currently active queue. |
| 2101.6 | The response from 2101.5 containing status of the post. |
| 3101.1 | The Queuing Web Service request for any currently active queue for the consumer from the Internal Service. |
| 3101.2 | The response from 3101.1 containing any currently active queue for the consumer. |
| 3101.3 | The Queuing Web Service post to specify the included queue be the active queue for the consumer. |
| 3101.4 | The response from 3101.3 containing the QTransId for the currently active queue. |
| 3101.5 | The Queuing Web Service request for the EndPointId of the specified LocationId. |
| 3101.6 | The response from 3101.5 containing the EndPointId. |
| 3102.1 | The Queuing Web Service message containing the EndPointId to process the specified queue. |
| 3401.1 | The Automated-Transaction-Machine Manager Service post to specify the EndPointId and LocationId be associated and stored for other processes to retrieve. |
| 3401.2 | The response from 3401.1 containing the status of the post. |
| 3401.3 | The Automated-Transaction-Machine Manager Service requests the QTransId for the currently active queue for the consumer. |
| 3401.4 | The response from 3401.3 containing the QTransId. |
| 3401.5 | The Automated-Transaction-Machine Manager Service requests the transaction information for the QTransId. |

TABLE 4-continued

Data Transfers

| | |
|---|---|
| 3401.6 | The response from 3401.5 containing the transaction information. |
| 3401.7 | The Automated-Transaction-Machine Manager Service post to specify for a QTransId and TransId the status of the transaction processing. |
| 3401.8 | The response from 3401.7 containing the status of the post. |
| 3401.9 | The Automated-Transaction-Machine Manager Service post to specify for a QTransId the status of the queue processing. |
| 3401.10 | The response from 3401.9 containing the status of the post. |
| 3402.1 | The Automated-Transaction-Machine Manager Service message containing the LocationId for a specified Automated-Transaction-Machine Agent. |
| 3402.2 | The Automated-Transaction-Machine Manager Service message that commands the Automated-Transaction-Machine Agent to indicate a transaction is in progress. |
| 3402.3 | Any Automated-Transaction-Machine Manager Service message that is required to command the Automated-Transaction-Machine Agent to process a transaction. |
| 3402.4 | The Automated-Transaction-Machine Manager Service message that commands the Automated-Transaction-Machine Agent to indicate a queue processing has completed. |
| 3403.1 | The Automated-Transaction-Machine Manager Service message contains the QTransId for the completed queue. |
| 3501.1 | The Biometric Manager Service request to get the EndPointId for the specified LocationId. |
| 3501.2 | The response from 3501.1 containing the EndPointId. |
| 3502.1 | The Biometrix Manager Service message to the Automated-The Queue Status Service requests the queue and transaction information for the specified QTransId. |
| 3601.1 | Transaction-Machine Manager Service with the ConsumerId and EndpointId. |
| 3601.2 | The response from 3601.1 containing the queue and transaction information. |
| 3602.1 | The Queue Status Service post to send the queue of transaction information to the FI Web Service. |
| 3602.2 | The response from 3602.1 containing the status of the post. |
| 3603.1 | The Queue Status Service post to send transaction information to the Notification Service. |
| 3603.2 | The response from 3603.1 containing the status of the post. |
| 3701.1 | The email or SMS message to the consumer with a transaction status. |
| 4101.1 | Any Automated-Transaction-Machine Agent message that is required to notify the Automated-Transaction-Machine Manager Service of the status of commands sent to the Automated-Transaction-Machine Agent or the status of the Automated-Transaction-Machine hardware. |
| 4201.1 | The Automated-Transaction-Machine Agent specifies the QR display present the LocationId in an image. A Consumer Mobile Device's Camera captures the QR image. |
| 4302.1 | The Automated-Transaction-Machine Agent specifies the NFC transceiver emit the LocationId on request. A Consumer Mobile Device's NFC Reader receives the LocationId. |
| 5101.1 | The message to the Biometric Manager Service with the ConsumerId from the Biometric Service at a known IP address. |

Figure 17:
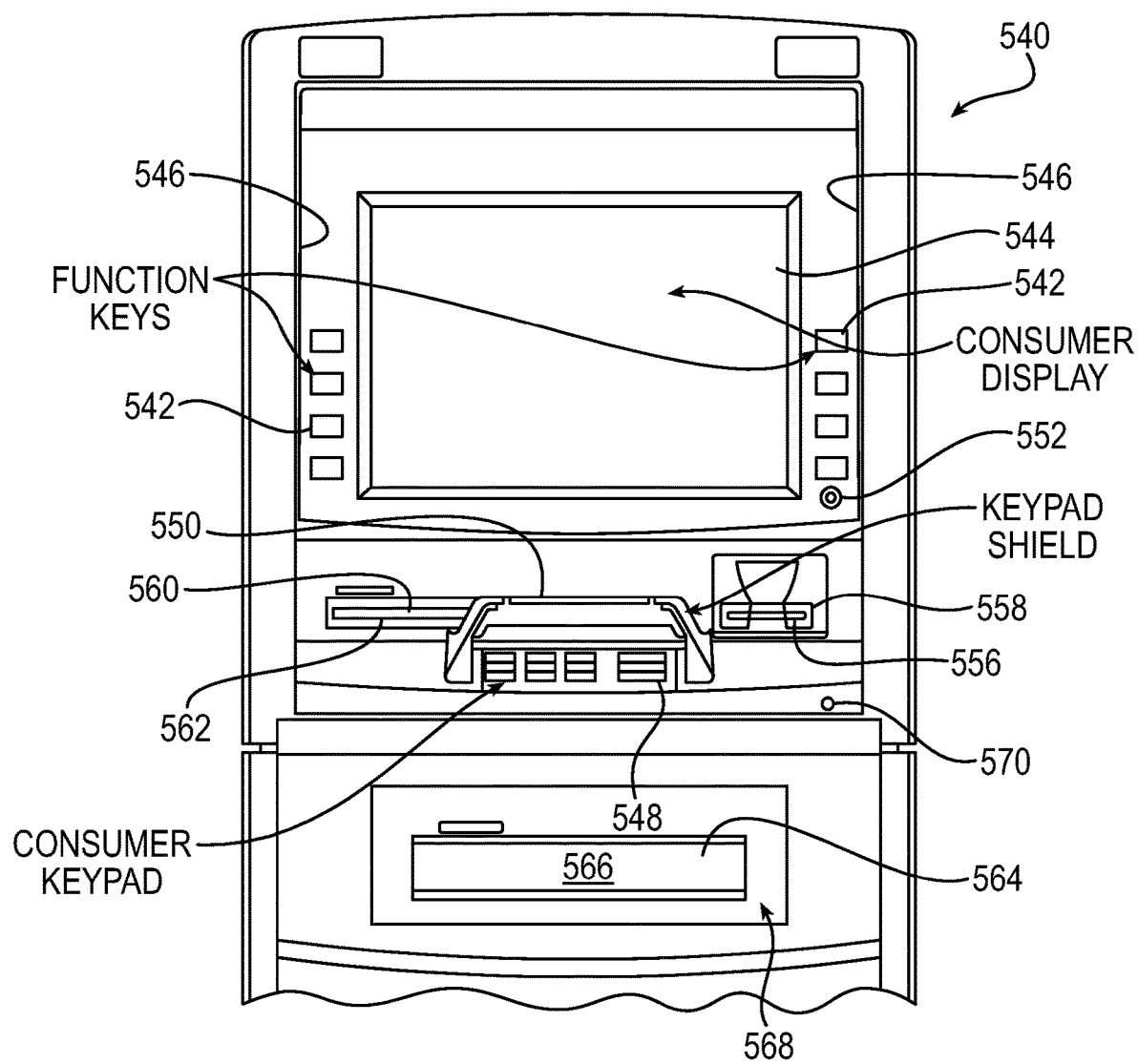
FIG. 17 is perspective view of a traditional automated teller machine.

FIG. 17 illustrates an example known automated-teller-machine 540 and is provided herein so that a relative comparison may be performed with the embodiments of the Automated-Transaction-Machine lacking a keypad, lacking a card reader, lacking an alphanumeric screen, and lacking other components as discussed above. Specifically, the exemplary ATM 540 in FIG. 15 includes a keypad 548 that has user interface buttons. The keypad 548 has an overlying relation thereof a keypad shield or cover 550. Each of the keys of the keypad as well as the area within the keypad cover may be commonly contacted by user fingers in operation of the ATM 540.

Also included in the known ATM 540 is a headphone jack 552. Headphone jack 552 is adapted to receive plug in connectors from headphones used by visually impaired persons in the operation of the machine. An area adjacent to the headphone jack 552 will commonly be contacted by fingers of machine users, particularly visually impaired user.

Figure 15:
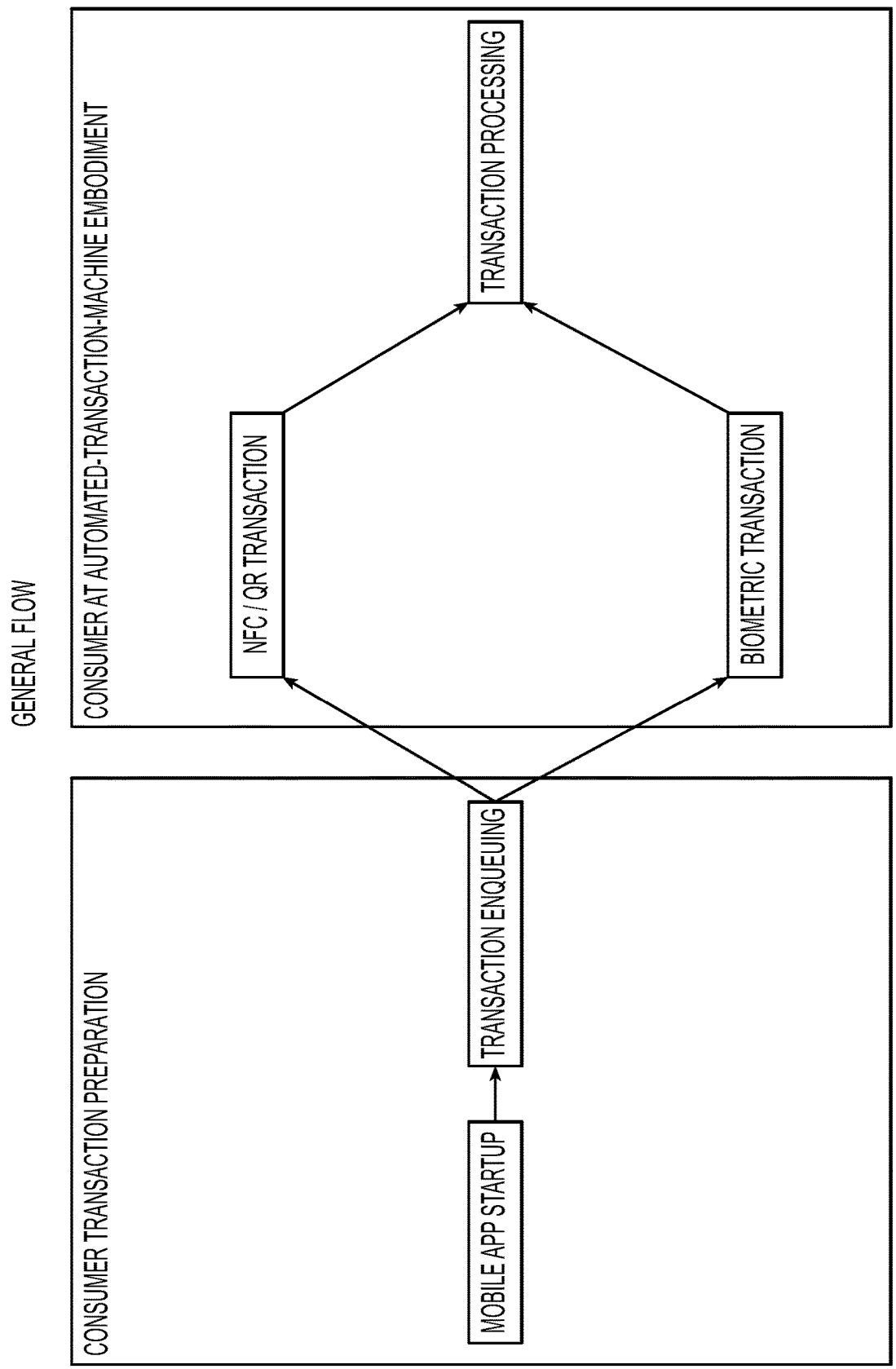
FIG. 15 is a general flow diagram that includes both consumer-transaction preparation and transaction processing at an Automated-Transaction-Machine embodiment.

The exemplary ATM 540 shown in FIG. 15 also includes a receipt printer that is in operative connection with a paper outlet 560. The paper outlet area generally indicated 562, extends generally adjacent to the paper outlet in an area where users will commonly contact the machine fascia when taking receipts that are printed by the machine during transactions. A cash dispenser outlet 564 is operative to deliver cash from the ATM to users. In this known ATM the cash dispenser outlet is generally blocked by one or more gate members 566 except when the ATM is operating to deliver cash to a user. During such times at least one processor of the machine is operative to cause an actuator to move the gate member so that currency bills can be extended therethrough. A cash outlet area generally indicated 568 includes an area that extends generally adjacent to the cash dispenser outlet (and may include the outlet as well as the gate member thereof) and which users generally contact the machine with their fingers when obtaining cash from the machine 540. Also shown are a screen 544, a card reader 558, a card-reader orifice 556, function keys, a consumer display, and a consumer keypad.

Example methods may be better appreciated with reference to flow diagrams. For purposes of simplicity, explanation of the illustrated methodologies are shown and described as a series of blocks. It is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not-illustrated blocks. Thus, the depicted blocks, functions and/or other components may be implemented as parts of a monolithic software structure, as standalone software modules, or as modules that employ external routines, code, services, and so forth, or any combination of these. All such implementations are within the scope of the present disclosure.

Figure 18:
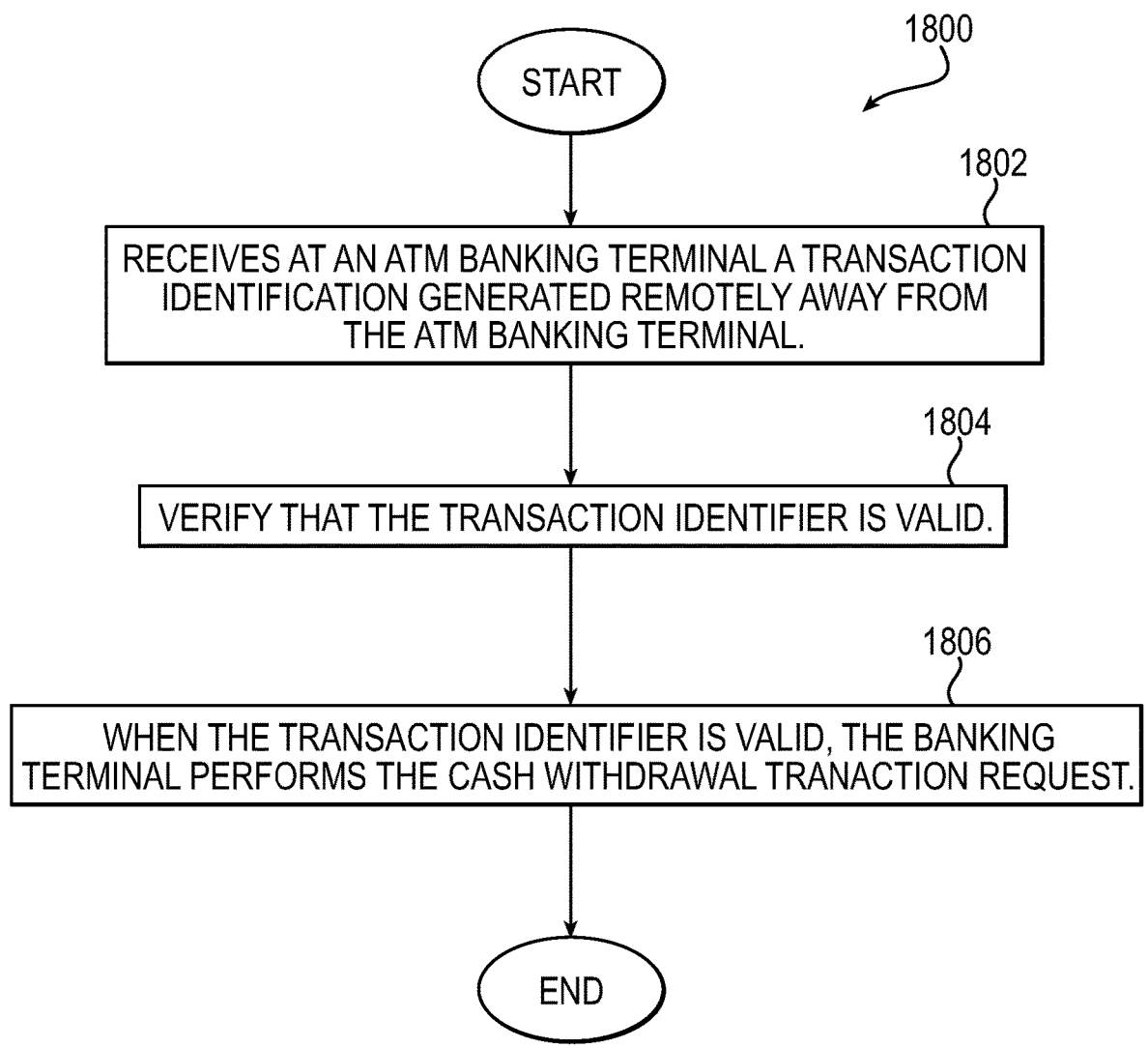
FIG. 18 is an example method of withdrawing cash at an ATM banking terminal.

FIG. 18 illustrates a method 1800 of withdrawing cash at an ATM banking terminal. The method receives at the ATM banking terminal a transaction identification of a cash withdrawal transaction request for an amount of cash, at 1802. The cash withdrawal transaction request was previously created by a banking customer using a device remote from the ATM banking terminal and was created before the banking customer arrived at the ATM banking terminal with the cash transaction identification. The transaction identifier is validated, at 1804. In some embodiments, the ATM banking terminal in communication with the banking system equipment may verify the transaction identifier by checking with the banking system computer to determine if the transaction identifier is still valid, has proper fields and/or formats and/or has other characteristics as understood by those of ordinary skill in the art. When the transaction identifier is valid, the banking terminal performs the cash withdrawal transaction request, at 1806. In the preferred embodiment, the withdrawal transaction request is executed while the banking customer is at the banking terminal by dispensing at the banking terminal the amount of cash earlier specified by the cash withdrawal transaction to the banking customer.

Figure 19:
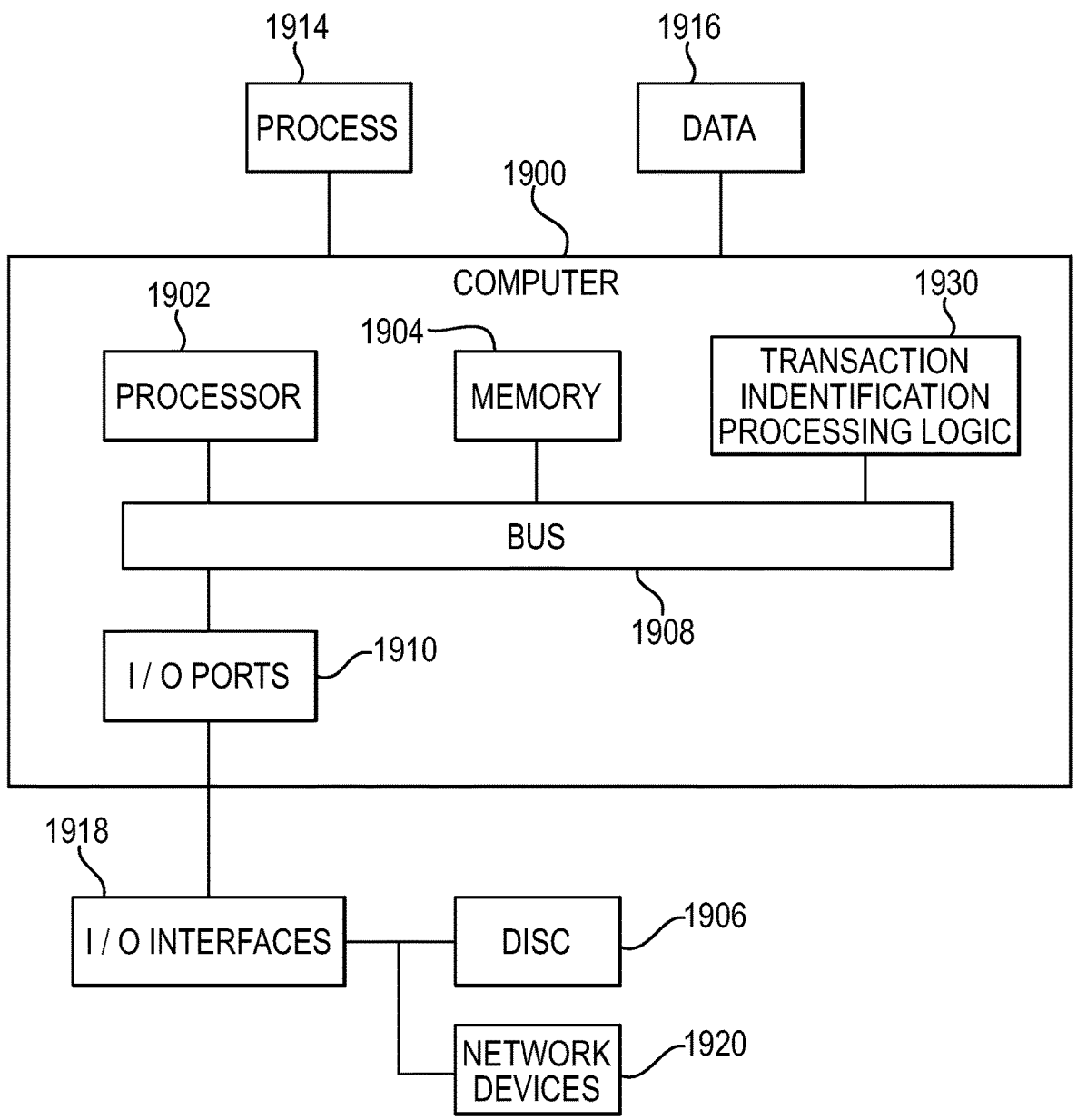
FIG. 19 is an example computing environment in which various embodiments or portions of embodiments may operate.

FIG. 19 illustrates an example computing device in which example systems and methods described herein, and equivalents, may operate. The example computing device may be a computer 1900 that includes a processor 1902, a memory 1904, and input/output ports 1910 operably connected by a bus 1908. In one example, the computer 1900 may include a transaction identification processing logic 1930 assist a customer in onboarding account data from a banking card at an ATM. In different examples, the transaction identification processing logic 1930 may be implemented in hardware, software, firmware, and/or combinations thereof. Thus, the logic 1930 may provide means (e.g., hardware, software, firmware) for receiving a transaction identification then to verify and process the transaction identification. While the logic the 1930 is illustrated as a hardware component attached to the bus 1908, it is to be appreciated that in one example, the logic 1930 could be implemented in the processor 1902.

Generally describing an example configuration of computer 1900, processor 1902 may be a variety of various processors including dual microprocessor and other multi-processor architectures. Memory 1904 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), direct RAM bus RAM (DR-RAM) and the like.

A disk 1906 may be operably connected to computer 1900 via, for example, an input/output interface (e.g., card, device) 1918 and an input/output port 1910. Disk 1906 may be, for example, a magnetic disk drive, a solid state disk drive, a floppy disk drive, a tape drive, a Zip drive, a flash memory card, and/or a memory stick. Furthermore, disk 1906 may be a CD-ROM, a CD recordable drive (CD-R drive), a CD rewriteable drive (CD-RW drive), and/or a digital video ROM drive (DVD ROM). Memory 1904 can store a process 1914 and/or a data 1916, for example. Disk 1906 and/or memory 1904 can store an operating system that controls and allocates resources of computer 1900.

Bus 1908 may be a single internal bus interconnect architecture and/or other bus or mesh architectures. While a single bus is illustrated, it is to be appreciated that computer 1900 may communicate with various devices, logics, and peripherals using other busses (e.g., PCIE, SATA, Infiniband, 1384, USB, Ethernet). Bus 1908 can be types including, for example, a memory bus, a memory controller, a peripheral bus, an external bus, a crossbar switch, and/or a local bus.

Computer 1900 may interact with input/output devices via input/output interfaces 1918 and input/output ports 1910. Input/output devices may be, for example, a keyboard, a microphone, a pointing and selection device, cameras, video cards, displays, the disk 1906, the network devices 1920, and so on. The input/output ports 1910 may include, for example, serial ports, parallel ports, USB ports and the like.

The computer 1900 can operate in a network environment and thus may be connected to network devices 1920 via input/output interfaces 1918, and/or the input/output ports 1910. Through network devices 1920, computer 1900 may interact with a network. Through the network, computer 1900 may be logically connected to remote computers. Networks with which computer 1900 may interact include, but are not limited to, a local area network (LAN), a wide area network (WAN), and other networks. The networks may be wired and/or wireless networks.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example" and so on, indicate that the embodiment(s) or example(s) so described may include a particular feature, structure, characteristic, property, element, or limitation, but that not every embodiment or example necessarily includes that particular feature, structure, characteristic, property, element, or limitation.

What is claimed is:

1. A cash-dispensing banking terminal comprising:
a housing;
a transmitter;
a receiver;
a cash dispenser;
a processor at least partially configured to control the cash dispenser;

a vault configured to be loaded with cash for an executable banking transaction;

wherein a pre-created banking transaction request was created with a mobile device before a banking customer and the mobile device arrive at the cash-dispensing banking terminal, wherein a remote computing device authenticates and authorizes the pre-created banking transaction request before the banking customer and the mobile device arrive at the cash-dispensing banking terminal, and wherein when the pre-created banking transaction is authenticated and authorized the remote computer is configured to generate the executable transaction request as well as to generate and send a transaction identifier associated with the executable transaction request to the mobile device;

wherein the receiver is configured to receive the transaction identifier from the mobile device when the banking customer is at the cash-dispensing banking terminal, and wherein the remote computer is configured to verify the transaction identifier is valid and to authorize the executable transaction request while the banking customer is at the banking terminal;

wherein the cash-dispensing banking terminal is an automated transaction machine (ATM) lacking a keypad and lacking a card reader and lacking an alphanumeric screen; and a front panel that is slidable away from a remainder of the ATM when the ATM is to be placed in operation, with an opening in the front panel through which cash is dispensed to the banking customer.

2. The cash-dispensing banking terminal of claim 1 wherein the executable transaction request includes a request to dispense an amount of currency from the banking terminal.

3. The cash-dispensing banking terminal of claim 2 wherein the amount of currency is pre-deducted from a banking account of the banking customer before the banking customer is at the banking terminal.

4. The cash-dispensing banking terminal of claim 1 wherein the transaction identifier is valid for a limited time and after the limited time the transaction identifier is void and the executable transaction request cannot be performed.

5. The cash-dispensing banking terminal of claim 4 wherein the limited time is two hours or less.

6. The cash-dispensing banking terminal of claim 1 wherein the banking terminal is lacking user interface buttons.

7. The cash-dispensing banking terminal of claim 1 wherein the receiver is configured to receive the banking transaction request using wireless near field communication (NFC) traveling a distance of three feet or less, and wherein the transmitter is an NFC wireless transmitter.

8. The cash-dispensing banking terminal of claim 1 wherein software on the mobile device communicates with the remote computing device to authenticate and authorizes the pre-created banking transaction request before the banking customer and the mobile device arrive at the cash-dispensing banking terminal.

9. The cash-dispensing banking terminal of claim 1 wherein the mobile device is a mobile phone.

10. The cash-dispensing banking terminal of claim 1 wherein the receiver is configured to receive the transaction identifier from the mobile device when the mobile device is tapped against the banking terminal.

11. The cash-dispensing banking terminal of claim 1 wherein the mobile device has no communications with the banking terminal until after the transaction identifier and executable transaction request are created.

12. The cash-dispensing banking terminal of claim 1 wherein the ATM further comprises:
a biometric sensor positioned the front panel facing the same direction as the opening.

13. A cash-dispensing banking terminal comprising:
a housing;
a transmitter;
a receiver;
a cash dispenser;
a processor at least partially configured to control the cash dispenser;
wherein the cash-dispensing banking terminal is an automated transaction machine (ATM) lacking a keypad and lacking a card reader and lacking an alphanumeric screen;
a front panel having an opening through which cash is dispensed to a banking customer, the front panel slidable away from a remainder of the ATM when the ATM is to be placed in operation, with an opening in the front panel through which cash is dispensed to the banking customer;
a vault configured to be loaded with cash for an executable banking transaction;
wherein a pre-created banking transaction request was created with a mobile device before a banking customer and the mobile device arrive at the cash-dispensing banking terminal, wherein a remote computing device authenticates and authorizes the pre-created banking transaction request before the banking customer and the mobile device arrive at the cash-dispensing banking terminal, and wherein when the pre-created banking transaction is authenticated and authorized the remote computer is configured to generate the executable transaction request as well as to generate and send a transaction identifier associated with the executable transaction request to the mobile device;
wherein the receiver is configured to receive the transaction identifier from the mobile device when the banking customer is at the cash-dispensing banking terminal, and wherein the remote computer is configured to verify the transaction identifier is valid and to authorize the executable transaction request while the banking customer is at the banking terminal; and
at least one light emitting diode (LED) positioned around the opening and configured to illuminate a first color when no transaction identifier has been received, when the transaction identifier is invalid, or when no banking transaction is being processed, and wherein the at least one LED is configured to illuminate a second color that is different than the first color when an event occurs that is at least one of the group of: the transaction identifier has been received, when the transaction identifier is valid, or when the banking transaction is being processed.

14. The cash-dispensing banking terminal of claim 13 wherein the at least one LED is the only structure of the terminal that emits light.

* * * * *